United States Patent [19]

Gudea et al.

[11] 4,139,892
[45] Feb. 13, 1979

[54] ELECTRONIC POSTAGE SCALE

[75] Inventors: Dumitru D. Gudea, Chicago; Thomas L. Bryant, Forest Park; Wan-On Chan, Des Plaines, all of Ill.

[73] Assignee: Triner Scale and Manufacturing Company, Chicago, Ill.

[21] Appl. No.: 816,724

[22] Filed: Jul. 18, 1977

[51] Int. Cl.² .................... G01G 19/413; G06F 11/02
[52] U.S. Cl. ..................... 364/567; 177/25; 177/50; 364/466; 364/571
[58] Field of Search ............. 364/466, 567, 571; 177/25, 56

[56] References Cited

U.S. PATENT DOCUMENTS

| | | | |
|---|---|---|---|
| 3,635,297 | 1/1972 | Salava | 177/25 |
| 3,665,169 | 5/1972 | Henderson et al. | 364/567 |
| 3,692,988 | 9/1972 | Dlugos et al. | 364/466 |
| 3,786,884 | 1/1974 | Allenspach | 364/571 |
| 3,869,005 | 3/1975 | Williams, Jr. et al. | 177/25 |
| 3,896,012 | 10/1975 | Loshbough et al. | 364/466 |
| 3,916,173 | 10/1975 | Williams, Jr. et al. | 364/466 |
| 3,951,221 | 4/1976 | Rock | 177/25 |
| 4,036,316 | 7/1977 | Rock | 177/25 |
| 4,043,412 | 8/1977 | Rock | 177/25 |
| 4,047,006 | 9/1977 | Ellner | 364/466 |
| 4,051,913 | 10/1977 | Gudea | 177/25 |
| 4,080,657 | 3/1978 | Caldicott et al. | 364/567 |

FOREIGN PATENT DOCUMENTS 2601151 4/1977 Fed. Rep. of Germany ........... 364/571

Primary Examiner—Felix D. Gruber
Attorney, Agent, or Firm—Pasquale A. Razzano

[57] ABSTRACT

An improved scale, and particularly an electronic postage scale, wherein a parcel is weighed and postage is computed automatically in accordance with the weight of the parcel and the particular class of shipment and destination zone therefor. It is one feature of this scale to determine a corrected reference level against which the parcel is weighed, notwithstanding changes in this reference level over a period of time due to, for example, parameter changes, electrical "drift," a build-up of particles, such as dirt or other residue, or the like. Another feature of this scale is improved, simplified automatic calibration. The scale is provided with a keyboard which, during a calibration operation, is selectively operated so as to key-in numerical data representing a standard weight. The keyed-in data is compared to the standard weight as actually measured by the scale, and a calibration factor is generated by dividing the keyed-in data by the measured standard weight. This calibration factor then is used as a multiplier for all subsequent measured weights.

In one embodiment of the electronic postage scale, a micro-processor unit is used in conjunction with random access memories (RAM) and programmable read only memories (PROM) to perform a weighing operation, a postage calculating operation and a data display operation, in accordance with the weighed parcel and various keyboard entries.

10 Claims, 10 Drawing Figures

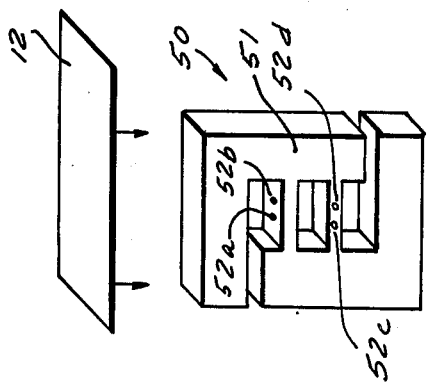
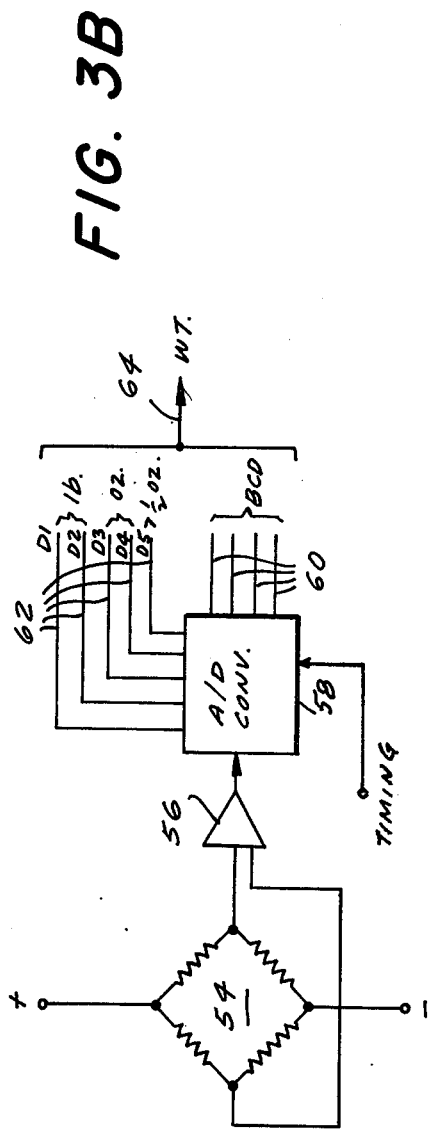
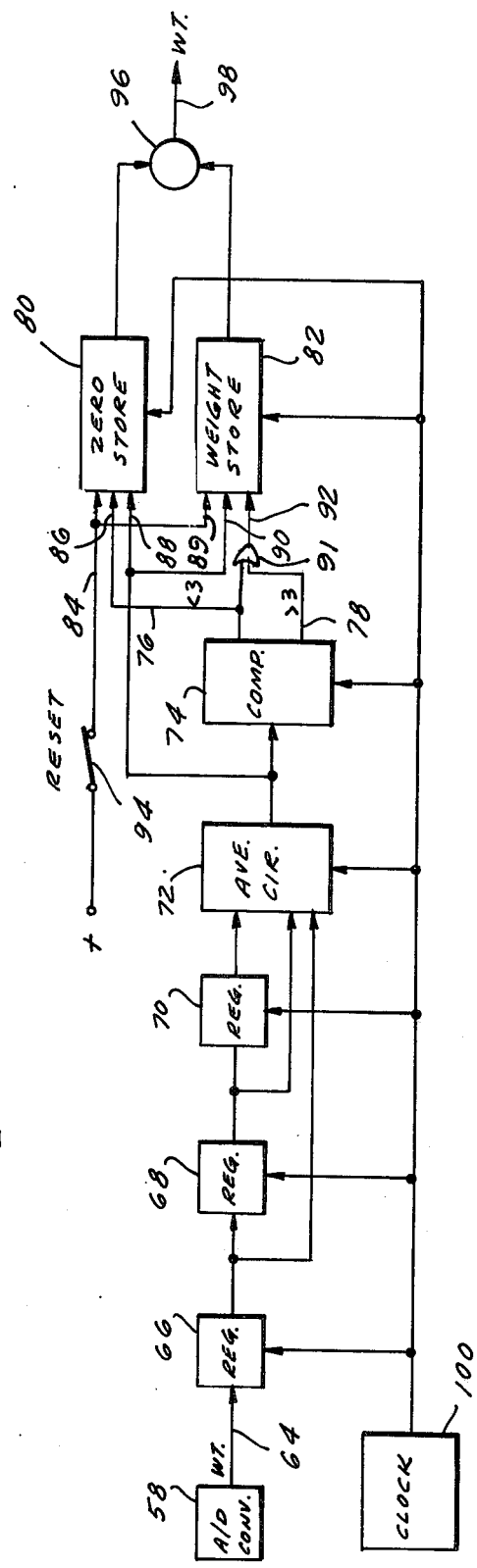
FIG. 3A
FIG. 3B
FIG. 4

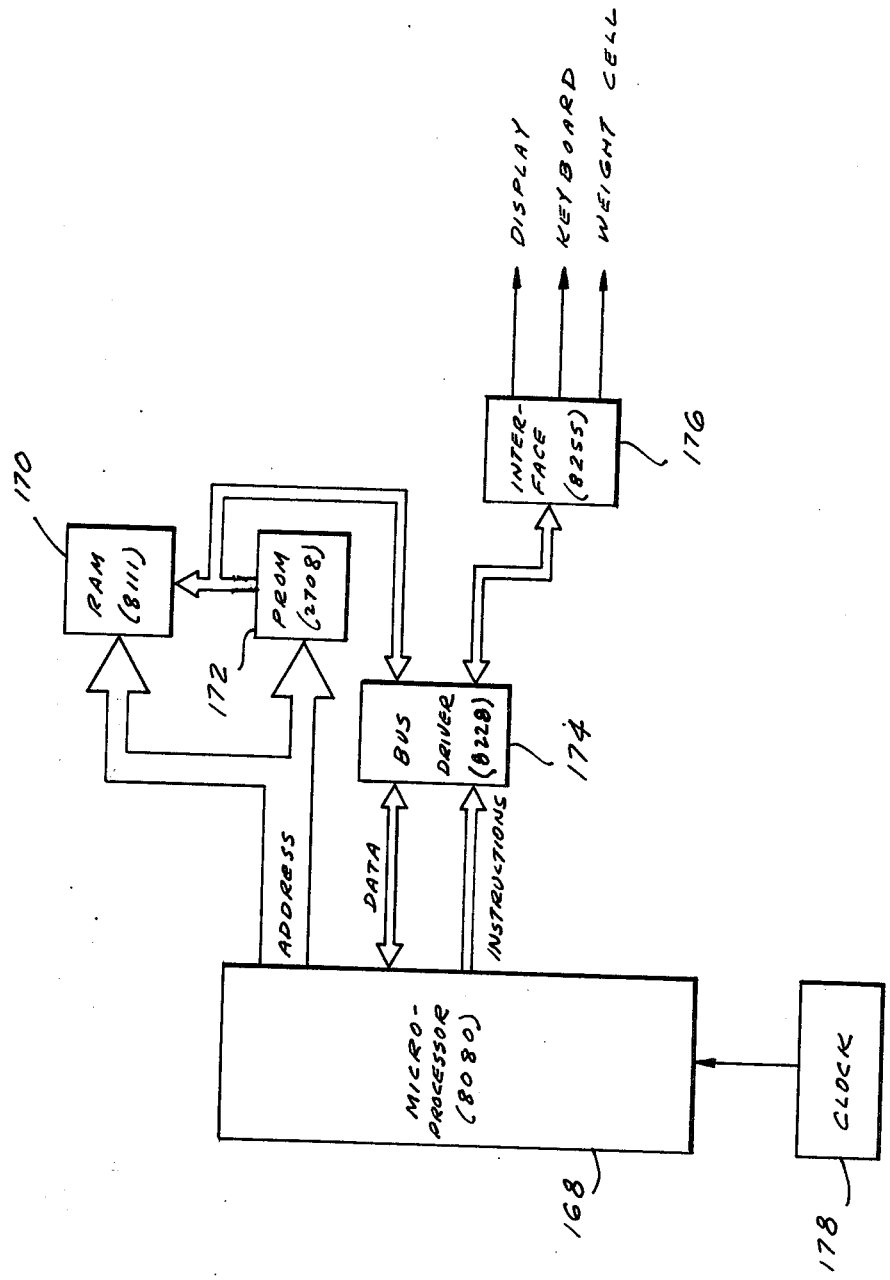

ELECTRONIC POSTAGE SCALE

BACKGROUND OF THE INVENTION

This invention relates to an electronic postage scale and, more particularly, to such a scale having an improved automatic "zero" or reference level adjustment feature, and exhibiting simplified, improved automatic calibration. In an embodiment to be described, the electronic postage scale is provided with an electronic micro-processor unit for carrying out a parcel weighing operation, for calculating the required postage in accordance with the weighed parcel and a selected destination zone and class of shipment of that parcel, and for displaying pertinent information in accordance with the weighing and calculating operations.

In determining the requisite postage for a parcel to be mailed to a desired destination, such postage is dependent upon the weight of the parcel, the particular destination zone and the class of shipment that is desired. In general, each class of shipment which is available is associated with a unique postage rate. Thus, the United States Postal Service provides first, second and third class service, parcel post service, priority mail service, and book rate service. Also, United Parcel Service provides interstate, intrastate and blue label services.

Prior to the advent of automatic postage calculating devices, proper postage could be determined only by weighing the parcel to be shipped and then consulting the appropriate reference table associated with a selected class of shipment in order to find the postage for the weighed parcel which is to be shipped by that class of shipment to a desired destination zone. This postage-determining technique was time consuming and was subject to erros which inadvertently could occur during normal usage of the numerous reference tables; thus providing a definite need and desirability for automatic postage calculating devices.

One example of an automatic postage scale is disclosed in U.S. Pat. No. 3,738,438. Digital techniques are used to provide an automatic indication of the postage required for a selected class of shipment of a parcel to a destination zone. The postage data for each class of shipment and destination zone are provided as coded perforations in an adjustable postage code roll. Hence, the postage codes are arranged on the roll in a plurality of groups, each group representing the postage rates for a particular combination of destination zone and class of shipment. The roll is advanced until the proper rate group is selected, whereupon further codes representing the postage for various parcel weights in the selected rate group are sensed. The particular code associated with the weight of the parcel is read out and the postage data represented by that code is displayed.

The use of a coded roll in conjunction with a postage scale is both a laborious and time-consuming operation. Furthermore, the overall dimensions of the postage scale must be sufficiently large in order to accommodate suitable coded rolls; thus requiring that the postage scale occupy space that otherwise could be advantageously and economically used.

In the past, postage rates, and particularly U.S.P.S. rates, were not necessarily linear for various classes of shipment and destination zones. For example, the postage for a two-pound parcel shipped to a selected destination zone by a particular class of shipment did not necessarily include a factor which was twice the postage for a one-pound parcel. Therefore, in order to provide an automatic determination of proper postage, a recently proposed electronic postage scale used a plurality of electronic or magnetic memory units, or sections, each unit being associated with a particular class of shipment to store postage data for each increment of weight of a parcel to be shipped to each destination zone encompassed by that class of shipment. This type of postage scale is described in copending application No. 652,820, filed Jan. 27, 1976 now U.S. Pat. No. 4,051,913 by Gudea, a coinventor of the instant invention. While the postage scale of this copending application operates satisfactorily, the use of a large number of memory units contributes substantially to the overall cost of the scale. Furthermore, as postage rates for the various classes of shipment change, the associated memory units must be replaced by other units within which updated postage information is stored.

Recently, U.S.P.S. and UPS postage rates have been changed so as to be substantially linear for the various destination zones included in each class of shipment. With such linearity, it may not be necessary to store the postage data for each increment of weight of a parcel to be shipped to each destination zone via each class of shipment. Rather, the postage rate per unit of weight can be stored for each destination zone in each class of shipment, and the appropriate rate can be multiplied by the determined parcel weight in order to calculate the correct postage. This permits a significant reduction in memory capacity, thus correspondingly reducing the overall cost of the postage scale.

Another disadvantage of some previously proposed postage scales is that the zero, or reference level, against which a parcel is weighed can vary over a period of time. For example, in a scale of the type having various beams and balances coupled to and movable by the weighing platform, normal wear and tear of the mechanical components will result in an effective "drift" of the zero level. Hence, a parcel which actually weighs one pound three and one-half ounces, as an example, may be measured to weigh one pound three ounces or one pound four ounces. This change in the measured weight of the parcel will, of course, directly affect the calculated postage. Similarly, in electronic postage scales, changes in the parameters of the electrical components may occur due to temperature coefficients, longevity of the components, and the like. Also, the zero level may change because of accumulations of dust, dirt or other residue on the weighing platform. Heretofore, in order to account for such zero level changes, the postage scale must be periodically checked or examined for accuracy.

Still another disadvantage of some previously proposed postage scales resides in the calibration thereof. A typical calibration operation had been carried out by placing a standard weight on the weighing platform of the scale and then manually adjusting either various mechanical components or electrical elements (such as potentiometers, trimmers or the like) until the scale indicated the correct standard weight. Such calibration operations are time-consuming and often were subjected to various inadvertent errors during manual adjustments.

OBJECTS OF THE INVENTION

Therefore, it is an object of the present invention to provide an improved electronic postage scale which overcomes the aforenoted disadvantages.

Another object of this invention is to provide improved apparatus for automatically adjusting the zero or reference level in a force-measuring device, such as in a scale.

A further object of this invention is to provide improved calibration apparatus for use in a force-measuring system, such as a scale, wherein calibration is achieved automatically without requiring the manual adjustment of various mechanical and/or electrical components.

An additional object of this invention is to provide an electronic postage scale which incorporates a microprocessor unit for calculating the weight of a parcel, for detecting a selected class of shipment and destination zone for that parcel, for calculating the correct postage for shipping that parcel to the selected destination zone via the selected class of shipment and for displaying pertinent information, including the calculated postage, associated with the postage-determining operation.

Various other objects, advantages and features of the present invention will become readily apparent from the ensuing detailed description, and the novel features will be particularly pointed out in the appended claims.

SUMMARY OF THE INVENTION

In accordance with this invention, an electronic postage scale is provided for weighing a parcel to be shipped, for permitting a desired destination zone and class of shipment for that parcel to be selected, for calculating the postage required to ship that parcel in accordance with the selected class and zone, and for indicating the calculated postage. One feature of this scale is to provide automatic zero, or reference level adjustment in the event that the reference level changes over a period of time. The adjusted reference level is used to determine the actual weight of the parcel. Still another feature of this scale is to provide automatic calibrating apparatus. Weight data for a standard weight is keyed into the scale, as by selected operation of a keyboard, and the standard weight is placed upon a weighing platform associated with the scale so as to provide a measure of the standard weight. The keyed-in weight is divided by the measured weight to provide a calibration factor; and this calibration factor then is used as a multiplier for all subsequently weighed parcels.

In accordance with one embodiment of the electronic postage scale, a micro-processor unit is provided for determining parcel weight, calculating the postage required to send that parcel to a selected destination zone via a selected class of shipment and to display pertinent information associated with the weighing and postage-calculating operations, such as the parcel postage, weight of the parcel and the destination zone. In a preferred embodiment, the weighing mechanism is comprised of a load cell having no moving parts, thus obviating complex mechanical weighing systems using balance beams, springs, and the like.

BRIEF DESCRIPTION OF THE DRAWINGS

The following detailed description, given by way of example, will best be understood in conjunction with the accompanying drawings in which:

FIG. 3A is a perspective, schematic view of a load cell which is used with the electronic postage scale of FIG. 1;

FIG. 3B is a schematic diagram of the parcel weight data generator used with the postage scale of FIG. 1;

FIG. 4 is a logic block diagram showing the zero, or reference level adjustment apparatus used with the postage scale of FIG. 1;

FIG. 9 is a block diagram showing an embodiment of the postage scale using a micro-processor unit.

DETAILED DESCRIPTION OF CERTAIN ONES OF THE PREFERRED EMBODIMENTS

Figure 1:
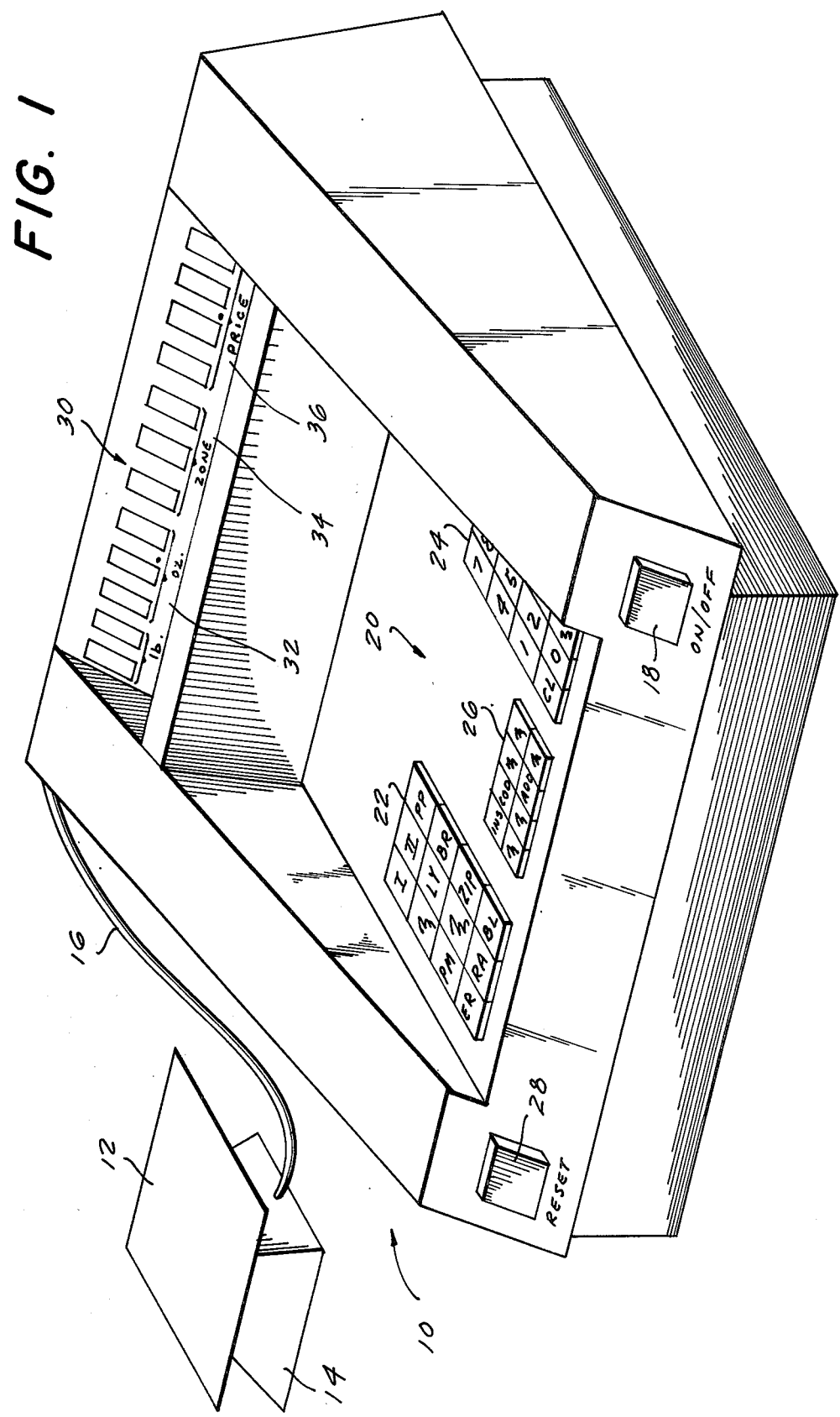
FIG. 1 is a perspective view of one embodiment of an electronic postage scale in accordance with the present invention.

Referring now to the drawings, wherein like reference numerals are used throughout, and in particular to FIG. 1, there is illustrated a perspective view of an electronic postage scale in accordance with the present invention. The electronic postage scale is formed of two basic components: a weighing platform 12 and postage scale electronics, generally designated by reference numeral 10. Weighing platform 12 preferably is comprised of a load cell 14, described in greater detail hereinbelow, which includes essentially no moving parts for providing an electrical output signal indicative of the weight of an article placed upon weighing platform 12. As will be described, load cell 14 preferably is formed of strain gauges connected in a circuit for producing a weight-indication signal which is transmitted via cable 16 to postal scale electronics 10. In alternative embodiments, load cell 14 is replaced by conventional, prior art weighing devices, such as a balanced scale, spring mechanism, balance beams, and the like. However, it is preferable to employ load cell 14 so as to avoid cumbersome and complex movable mechanical elements for determining the weight of that article placed upon weighing platform 12.

As shown in FIG. 1, postal scale electronics 10 includes a power supply switch 18, a keyboard 20, a reset key or switch 28, and a visual display 30. Power supply switch 18 is adapted to be manually operated so as to selectively supply operating voltage and current to the electronic system constituting postal scale electronics 10. Any suitable switch and power supply electonics may be used for this purpose.

Keyboard 20 preferably includes a set of class-of-service keys 22, a set of numeric keys 24 and a set of special services keys 26. The class-of-service keys are adapted to be selectively manually operated when postal scale electronics 10 is used to calculate the correct postage for shipping a parcel to a preselected destination zone via any one of various classes of service which are available. Accordingly, class-of-service keys 22 include individual keys for selecting U.S.P.S. services, such as first class, second class, third class, parcel post, priority mail and book rate; and UPS services, such as interstate, intrastate and blue label. Also included in the set of class-of-service keys 22 is a ZIP-to-zone selector key whereby, when this key is activated, postal scale electronics 10 carries out a conversion operation whereby a keyed-in ZIP code destination is converted to a zone designation which is used in determining the correct postage.

Numeric keys 24 are formed of individual keys corresponding to numerals 0, 1, ... 9, and additionally include a clear key CL whereby an inadvertent or erroneous keyboard entry will be cleared, thereby avoiding erroneous operation of postal scale electronics 10. Numeric keys 24 are selectively operable so as to key in data corresponding to a selected destination zone, a destination ZIP code or other numeric information which can be used by postal scale electronics 10, such as information representing a standard weight which will be used during a calibration operation.

Special services keys 26 include various individually operable keys for selecting particular services used in shipping parcels, such as an insurance key INS which, when operated, enables numeric keys 24 to be selectively actuated for providing an additional insurance fee which is to be taken into account in calculating postage, a COD key for enabling numeric keys 24 to be selectively actuated for providing a COD fee to be taken into account when calculating postage, etc. Special services keys 26 also include an addition key ADD which, when actuated, enables postal scale electronics 10 to add the special services fee (e.g. insurance, COD, etc.) to the calculated postage. Still further, special services keys 26 may include a so-called ratio key which, when actuated, enables postal scale electronics 10 to determine the number of individual pieces which are placed upon weighing platform 12 as a function of the measured weight of such pieces divided by the known weight of each piece.

Reset key 28 is manually operable and is adapted to reset postal scale electronics 10 to a reference, or zero, weight level. As will be described below, it is possible that, over a prolonged period of time, the zero level against which the weight of a parcel is compared during a weighing operation, may vary, or drift. Selective actuation of reset key 28 takes such "zero drifting" into account in re-establishing the correct reference level for determining the weight of a parcel. In another operable mode, the weight of an article placed upon weighing platform 12 may be compared to a desired weight, such as some standard weight, or other reference level. Selective actuation of reset key 28 provides for establishing this other reference level.

Display 30 is adapted to provide a numeric display of the weight of an article placed upon weighing platform 12, the selected destination zone (or ZIP code) for the article and the calculated postage for shipping that article to the selected destination zone via a selected class of service. Display 30 thus is divided into displays 32, 34 and 36 corresponding to weight, zone and postage, respectively, each comprising a plurality of selectively energizable elements, such as the so-called 7-segment display. Hence, each display element is capable of providing a visual indication of a decimal digit. Weight display elements 32 are divided into pounds, ounces and one-half ounce elements, the pounds elements being provided with units and tens digits and capable of displaying 0 to 99 pounds, the ounce display elements including units and tens elements for displaying 0 to 15 ounces, and the one-half ounce element including a single element for selectively displaying 0.0 or 0.5 ounces. Zone display elements 34 include three elements for selectively displaying either the first three digits of a destination ZIP code or the zone (L, 1 to 8) corresponding to the destination address. Postage display elements 36 include a two-digit dollars display (0 to 99) and a two-digit cents display (0 to 99). If the aforementioned ratio mode of operation is selected, either the weight, zone or postage display elements can be used to display the number of articles which are placed upon weighing platform 12.

While the operation of the various components constituting the postage scale will be discussed in greater detail hereinbelow, the operation of the illustrated apparatus will be described in conjunction with a typical postage calculation. Initially, power supply switch 18 is activated to supply operating voltage and current to postal scale electronics 10. Prior to placing a parcel upon weighing platform 12, reset key 28 is operated so as to establish a reference weighing level (hereinafter sometimes designated the zero level). Now, the parcel is placed upon weighing platform 12. Load cell 14 produces a signal corresponding to the weight of the parcel, and this signal is transmitted via cable 16 to postal scale electronics 10. The weight-indication signal produced by load cell 14 is suitably converted to appropriate digital data, and this data drives weight display elements 32 so as to provide a visual indication of the weight of the parcel.

Class-of-service keys 22 are selectively operated so as to establish a desired class of shipment. Then, the destination zone of the parcel is keyed into postal scale electronics 10 by the selective operation of one of numeric keys 24. The selected destination zone also is displayed by zone display elements 34. In the event that the destination zone is not known, but the operator is aware of the destinaion ZIP code, ZIP code key ZIP is operated and numeric keys 24 are activated to provide the first three digits of the destination ZIP code. These digits are displayed by zone display elements 34. Now, based upon the parcel weight (displayed by weight display elements 32), the selected class of service (corresponding to the actuated class-of-service key 22) and the destination zone (displayed by zone display elements 34), postal scale electronics 10 calculates the correct postage, and this postage is displayed by postage display elements 36. If a special service fee is to be added to the postage, a selected special service key 26 is operated, together with appropriate numeric keys 24, so as to key in the special service fee, which fee is displayed by, for example, postage display elements 36. Then, if addition key ADD is actuated, the special service fee is added to the calculated postage and this total postage is displayed by postage display elements 36.

The foregoing is a basic, simplified description of the overall operation of the illustrated postage scale in determining the weight of a parcel and in calculating the correct postage for that parcel. As mentioned previously, when used in the ratio mode operation, the postage scale will determine the number of articles placed upon weighing platform 12 in accordance with the total weight of such articles.

Figure 2:
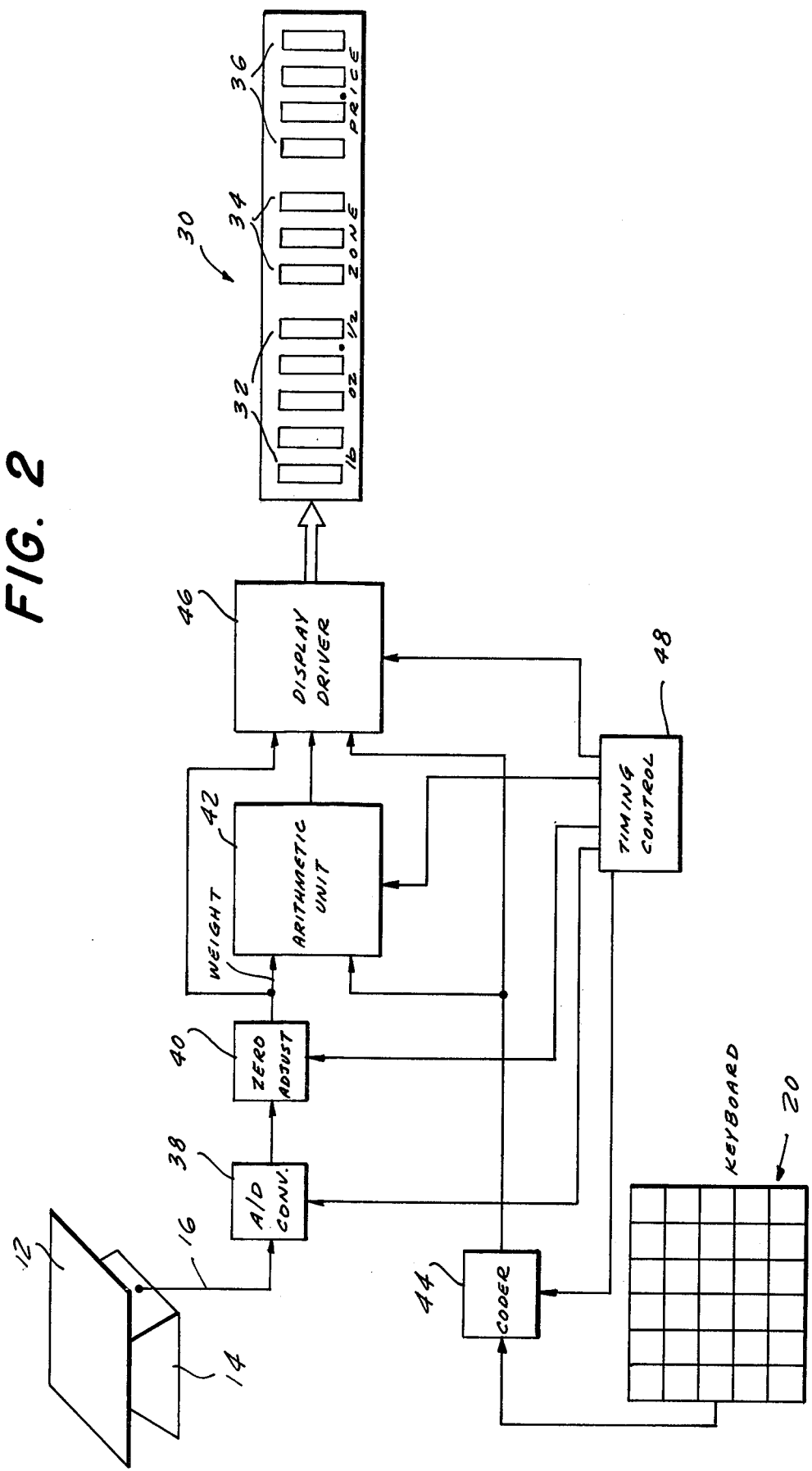
FIG. 2 is an overall block diagram of the electronic postage scale shown in FIG. 1.

Turning now to FIG. 2, a functional block diagram of postal scale electronics 10 is shown as comprising analog-to-digital converter 38, a zero adjust unit 40, an arithmetic unit 42, a keyboard encoder 33, a display driver 46 and a timing control generator 48. Analog-to-digital converter 38 is coupled to cable 16 and is adapted to receive the analog weight-indication signal generated by load cell 14. In a preferred embodiment, load cell 14 is a strain gauge load cell. In alternative embodiments, load cell 14 is comprised of a pressure sensor device for producing a signal representing the total pressure exerted on weighing platform 12. In yet another embodiment, load cell 14 includes a vibrating wire whose frequency or phase of vibration is modulated in accordance with the load placed upon weighing platform 12. Such pressure sensor devices and vibrating wire arrangements are known to those of ordinary skill in the art. The analog-to-digital converter is adapted to convert the analog weight-indication signal to a corresponding digital code. As an example, the weight-indication signal exhibits a range of from 0 to 100 pounds, and a resolution of 1/16 or 1/64 ounces. Hence, analog-to-digital converter 38 is capable of providing over 28,500 different codes. This would require a 15-bit word ($2^{15} = 32,768$) for a corresponding BCD representation of the weight-indication signal. However, in a preferred embodiment, analog-to-digital converter 38 provides a multiplexed 4-bit word with each word in the multiplexed signal representing, for example, a digit of weight. Such an analog-to-digital converter may include, for example, a Model LD 120, manufactured by Siliconix, Inc. of Santa Clara, California. Thus, the output of analog-to-digital converter 38 is a multiplexed five decimal digit BCD signal.

Analog-to-digital converter 38 also includes the so-called dual slope converter. Such a dual slop converter is manufactured by Intersil, Inc., of Delaware, as Model 7103A. In its operation, a dual slope converter integrates an input analog signal over a predetermined period of time, the converter including a counter circuit for counting pulses during this integration period. After integrating the analog signal, a reference signal of opposite polarity and predetermined voltage is integrated to return the output of the integrator to its initial value. Timing pulses again are counted during this second integration period, and the number of such pulses which are counted is directly proportional to the original input analog signal. These counted timing pulses then are converted to the aforementioned multiplexed 4-bit BCD code representing pounds, ounces and one-half ounces. This code, or weight data, is supplied to display driver 46 for display by weight display elements 32, as mentioned previously. The weight data also is supplied to arithmetic unit 42.

The various key elements of keyboard 20 can be considered to be arranged in a matrix array. Hence, when one or more key elements are actuated, a corresponding encoded representation of such key elements can be generated. Keyboard encoder 44 is coupled to keyboard 20 and is adapted to generate such encoded representations. A preferred embodiment of the keyboard encoder is described in greater detail hereinbelow in conjunction with FIG. 5. For the purpose of the present discussion, it may be noted that keyboard encoder 44 includes a scanning circuit to scan each key element included in the matrix array and to detent when a particular scanned element is actuated. A corresponding encoded signal then is generated in response to a detected actuated key element. This encoded keyboard data is supplied by keyboard encoder 44 to display driver 36, the latter driving display 30 to provide a suitable visual indication of the selectively actuated keyboard. For example, keyboard encoder 44 will provide data corresponding to the selected destination zone, which data is displayed by zone display elements 34.

The encoded keyboard data also is applied to arithmetic unit 42. As will be described below, arithmetic unit 42 includes a storage device, such as a memory unit, wherein weight rate data is stored for each destination zone included in each selectable class of service, this weight rate data representing the postage rate per unit of weight. As an example, such a memory unit will store data representing the postage per ounce for first class mail, the postage per pound for each zone for parcel post, etc. Depending upon the encoded keyboard data generated by keyboard encoder 44, the corresponding weight rate data is read out of the memory unit of arithmetic unit 42. The arithmetic unit also includes a multiplier, such as a binary multiplier, as described in "Integrated Circuits and Semiconductor Devices" by Deboo and Burrous, McGraw Hill Book Company (1971). This multiplier is supplied with the encoded weight data and the weight rate data read out of the aforementioned memory unit, and multiplies the respective data signals to produce a postage data signal representing at least a portion of the postage required for shipping the parcel placed upon weighing platform 12 to the selected destination via the selected class of service. As will be described below, the memory unit for storing the weight rate data also may store the package rate data, that is, the base postage required for sending a parcel of minimum weight to the selected destination zone via the selected class of service. Arithmetic unit 42 may further include an adder circuit, such as described in the aforementioned text "Integrated Circuits and Semiconductor Devices", for adding this package rate data to the calculated postage data, resulting in a total postage data signal. This total postage data signal is supplied to display driver 46 which, in turn, drives postage display elements 36 to provide a visual indication of the total postage data.

As shown, timing control generator 48 is coupled to each of analog-to-digital converter 38, zero adjust unit 40, arithmetic unit 42, keyboard encoder 44 and display driver 46 so as to synchronize the operations of these respective circuits. Accordingly, timing control generator 48 may include a reference oscillator, preferably of a high oscillating frequency, such as a crystal oscillator, this oscillator being coupled to a counting circuit and various gating circuits for generating recurrent timing pulses to be supplied to the illustrated circuits. The respective timing pulses need not be of the same frequency; and are adapted to provide timing pulses of suitable frequencies to the illustrated circuits. For example, the timing pulses applied to analog-to-digital converter 38 are adapted to sample the analog signal applied thereto, and to provide appropriate multiplexing clock signals for generating the BCD signal for each decimal digit. An another example, the timing pulses applied to zero adjust unit 40 are adapted to synchronize the rate at which the zero adjustment is made with the sampling rate at which the analog weight data is sampled. This is described in greater detail hereinbelow with respect to FIG. 4. The manner in which the various timing pulses are used to control the operation of arithmetic unit 42, keyboard encoder 44 and display driver 46 will be described in conjunction with the discussion of these particular circuits and with reference to FIGS. 5 and 8.

The operation of the respective circuits shown in FIG. 2 will be described individually, as follows:

WEIGHT DATA GENERATOR

Turning now to FIG. 3A, a schematic representation of load cell 14 is depicted as comprising a strain gauge cell 50. Strain gauge cell 50 is comprised of flexure element 51 having strain gauge elements 52a, 52b, 52c and 52d thereon. Depending upon the force exerted on flexure element 51, a corresponding change in the resistance of the respective strain gauges will occur. If it is assumed that weighing platform 12 is mounted on and-/or coupled to flexure element 51, then it is recognized that the resistance of the strain gauge element initially is modified as a function of the weight of the weighing platform. Any additional weight or force exerted on the weighing platform results in a corresponding additional change in the resistance of the strain gauge elements.

With reference to FIG. 3B, strain gauge elements 52a–52d are arranged in resistor bridge configuration 54, such as a Wheatstone bridge having operating voltage applied to the illustrated plus and minus terminals, thereby producing an output signal across the illustrated output terminals proportional to the unbalance condition of the bridge. Thus, an unbalance signal is produced by bridge 54 as a function of the force exerted on flexure element 51, which force is a combination of the weight of weighing platform 12 plus the weight of a parcel placed upon the weighing platform. This output signal produced by bridge 54 is applied to an amplifier 56 which, in turn, produces the aforementioned analog weight-indication signal. As a numerical example, the output signal produced by bridge 54 may exhibit a range from 0 to 30 or 45 mV. Preferably, amplifier 56 should have a gain in the range of from 60 to 150 so as to provide an analog weight-indication signal of suitable level to analog-to-digital converter 58. That is, the gain of amplifier 56 is such that distinguishable analog levels are produced as a function of the force exerted on flexure element 51.

As mentioned previously with respect to analog-to-digital converter 38, converter 58 preferably is of the multiplexed BCD output type, such as Model LD 120 manufactured by Siliconix, Inc. This BCD multiplexed output analog-to-digital converter includes an analog input terminal for receiving the analog weight-indication signal produced by amplifier 56 and a timing pulse input terminal for receiving the timing pulses produced by aforementioned timing control generator 48. The timing pulses applied to converter 58 are used as sample pulses so as to sample periodically the analog weight-indication signal. As a numerical example thereof, the weight-indication signal may be sampled five times per second. During each sample interval, different BCD outputs are produced at output terminals 60, each BCD output representing one decimal digit of the force exerted on flexure element 51. The particular decimal digit for which the BCD output is produced is represented by a signal applied to a corresponding decimal digit output 62 of analog-to-digital converter 58. As shown, decimal outputs 62 are associated with decimal digits D1, D2, D3, D4 and D5. The timing pulses applied to analog-to-digital converter 58 are used to derive the sequentially changing BCD output thereof as signals advance from output terminal D1 to output terminal D5. This cycling of the encoded data at output terminals 60 and 62 is performed at least once during each sampling interval and, preferably, a number of times during each sampling interval. Furthermore, the multiplexed BCD output signals at terminals 60 and 62 are applied through a weight data bus 64 to further apparatus. As one example, weight data bus 64 may be comprised of nine conductors corresponding to BCD output terminals 60 and decimal digit output terminals (D1–D5) 62. Parallel weight data is transmitted serially over bus 64. That is, parallel data is applied to output terminals 60 plus a selected one of output terminals D1–D5. Accordingly, weight data is transmitted by a signal at output terminal D1 plus BCD outputs at output terminals 60, followed by a signal at output terminal D2 plus BCD signals at output terminals 60, and so on until a signal is provided at output terminal D5 plus BCD data at output terminals 60. Then, converter 58 is recycled to repeat this sequence, with the BCD data at output terminals 60 corresponding to the analog weight-indication signal produced by amplifier 56.

ZERO ADJUSTMENT

Turning now to FIG. 4, a logic block diagram shown therein represents one embodiment of zero adjust unit 40. As shown, the zero adjust unit is comprised of registers 66, 68 and 70, an averaging circuit 72, a comparator circuit 74, storage circuits 80 and 82 and a clock unit 100. Registers 66, 68 and 70 are similar, and each is adapted to store temporarily therein the weight data supplied to bus 64 by analog-to-digital converter 58. As an example, each register may include at least five storage locations, each storage location being adapted to store the BCD data produced at output terminals 60 of analog-to-digital converter 58, and each storage location being associated with a respective decimal digital D1, D2, ... D5.

Registers 66, 68 and 70 are connected in cascade, and each register is coupled to clock unit 100 so as to receive shifting pulses therefrom. The contents of register 66 are shifted sequentially to register 68 and then to register 70 under the control of the shifting pulses generated by clock unit 100. Such shifting pulses are synchronized with the cycling of analog-to-digital converter 58 so as to shift the contents of the registers sequentially and in cascade when the analog-to-digital converter is cycled. Thus, as one example thereof, each register may comprise a parallel-bit shift register wherein parallel bits are shifted serially therethrough. Hence, when the BCD data corresponding to decimal digit D1 is produced by analog-to-digital converter 58, such data is shifted in parallel into the first location in register 66. When the BCD data associated with decimal digit D2 is produced, this data is shifted into the first location in register 66 and the BCD data associated with decimal digit D1 then is shifted into the second location in the register. This process is repeated until the BCD data associated with all of decimal digits D1–D5 is stored in register 66. Also, as the BCD data associated with each decimal digit is shifted into register 66, the previously stored BCD data is shifted into register 68. Similarly, as data is shifted into register 68, the BCD data previously stored therein is shifted into register 70.

Thus, it is seen that when registers 66, 68 and 70 are periodically "loaded," the BCD data stored in register 66 is the most recent weight data produced by analog-to-digital converter 58, the BCD data stored in register 68 is the previously produced weight data and the BCD data stored in register 70 is the oldest weight data. Although only three registers are shown in FIG. 4, it should be appreciated that, if desired, any number n of registers can be provided. Also, other conventional storage circuits can be used in place of the register units for storing the last n samples of the weight data produced by the analog-to-digital converter.

Averaging circuit 72 is coupled to each of registers 66, 68 and 70 and, in addition, includes a clock pulse input coupled to clock unit 100. The averaging circuit is adapted to produce a data signal corresponding to the average of the weight data stored in registers 66, 68 and 70. Accordingly, averaging circuit 72 is comprised of an adder circuit for adding the contents of the registers and a divider circuit for dividing the sum of the register contents by the number of registers. Examples of suitable binary adder and binary division circuits are described in the aforementioned text "Integrated Circuits and Semiconductor Devices." In a preferred embodiment, averaging circuit 72 is adapted to provide a multiplexed BCD output representing the average of the weight data stored in registers 66, 68 and 70, and thus may include a number of output buffer storage locations corresponding to decimal digits D1–D5. Clock unit 100 controls the operation of averaging circuit 72, and in one embodiment the averaging operation is performed upon decimal digits D1–D5 sequentially as the BCD data associated with these digits are shifted into the registers. In another embodiment, the averaging operation is performed only after all of the registers have been fully loaded. Both operations are contemplated herein, and the choice is one of design.

Comparator circuit 74 is coupled to averaging circuit 72 and is adapted to determine whether the averaged weight data produced by the averaging circuit changes by more than a predetermined amount during a given time interval. Accordingly, comparator circuit 74 may comprise two gated storage units, a subtractor unit and a decoder. Each gated storage unit is coupled to averaging circuit 72 and the storage units are "enabled" alternately at a rate which is synchronized with the clock pulse rate of clock unit 100. As a numerical example thereof, gate enable pulses may be supplied to comparator circuit 74 by clock unit 100 at a relatively slow rate, such as between 300 m sec and 30 seconds. First one and then the other storage unit is enabled in response to each of these clock pulses. Accordingly, updated averaged weight data is gated into first one and then the other storage unit. The updated averaged weight data is compared to the immediately preceding averaged weight data by subtracting one from the other in the subtractor circuit included in comparator circiut 74. If the updated averaged weight data differs from the next preceding averaged weight data by less than a predetermined amount, the decoder included in the comparator circuit and coupled to the subtractor circuit produces an enabling signal at output terminal 76. Conversely, if the updated averaged weight data differs from the next preceding averaged weight data by more than that predetermined amount, the decoder produces an enabling signal at output terminal 78. In one embodiment of this invention, this predetermined amount corresponds to a count of three based upon a count of over 25,000 for a resolution of up to 100 pounds of weight. That is, comparator circuit 74 is adapted to produce an enable signal at output terminals 76 or 78 depending upon whether the updated averaged BCD data produced by averaging circuit 72 differs from the next preceding averaged BCD data by less or more than a count of three, respectively.

Storage unit 80, hereinafter designated the zero store, may comprise a storage register for storing the BCD data produced by averaging circuit 72. Zero store 80 includes an enable input terminal 84, another enable input terminal 86 and a data input terminal 88. Enable input terminal 84 is coupled to a reset switch 94, such as aforementioned reset key 28 (FIG. 1). Enable input terminal 86 is coupled to output terminal 76 of comparator circuit 74 and data input terminal 88 is coupled to averaging circuit 72 for receiving the averaged (or change in the averaged) BCD data therefrom. An output terminal of zero store 80 is coupled to a subtracting circuit 96.

Storage unit 82, hereinafter designated the weight store, also is adapted to store the averaged BCD data produced by averaging circuit 72. Weight store 82 includes an enable input terminal 89, another enable input terminal 92 and a data input terminal 90. Enable input terminal 89 is coupled in common to enable input terminal 84 of zero store 80 and enable input termimal 92 is coupled to output terminal 76 and 78 of comparator circuit 74 by an OR gate 91. The output of weight store 82 is coupled to another input terminal of subtracting circuit 96.

Zero store 80 and weight store 82 include timing pulse inputs coupled to clock unit 100. The purpose of the timing pulse inputs is to synchronize the zero and weight stores to provide their stored data signals to subtracting circuit 96 at predetermined time intervals. In one embodiment, such time intervals may be once during each weighing operation. In another embodiment, such time intervals may be synchronized to the same rate at which comparator circuit 74 is operated. In still another embodiment, zero and weight stores 80 and 82 may be operated in response to the timing pulses supplied thereto by clock unit 100 at the same rate at which registers 66, 68 and 70, respectively, are loaded.

Subtracting circuit 96 may be a conventional circuit adapted to produce a multiplexed BCD output on weight data bus 98 representing the measured weight of a parcel placed upon weighing platform 12. Consistent with analog-to-digital converter 58, this digital weight data may be comprised of successive BCD codes representing decimal digits D1, D2, . . . D5.

As mentioned briefly hereinabove, the purpose of the zero adjust circuit shown in FIG. 4 is to provide an automatic adjustment to the zero, or reference level, in the event that such level varies or drifts slowly over a period of time. It is assumed that a slow variation is represented by a change between the updated averaged weight data and the immediately preceding averaged weight data less than a predetermined amount (for example, a count of three). This "small" change is further assumed to be attributed to changes in the circuit components due to, for example, temperature, age, etc., or due to the accumulation of dust, residue and the like on weighing platform 12. Conversely, a "large" change is represented by an enable signal produced at output terminal 78 of comparator circuit 74, and this large change is further assumed to be attributed to a parcel placed upon weighing platform 12. Therefore, the purpose of the circuit shown in FIG. 4 is to adjust, or update the zero or reference level stored in zero store 80 when a small change in the weight data is detected; while loading weight store 82 with the weight data in the event that a large change therein is detected.

In operation, the weight data supplied to data bus 64 by analog-to-digital converter 58 is shifted successively into the storage locations of register 66. It is recalled that this weight data is comprised of successive 4-bit BCD words, each word representing a respective decimal digit D1, D2, . . . D5 of the pounds, ounces and one-half ounce digits of the load exerted on flexure element 51 (FIG. 3A). In accordance with the assumption that the weight data is represented by five BCD words, at least five shift pulses from clock unit 100 are needed to shift this weight data into register 66. As the successive BCD words are shifted in register 66 from data bus 64, the previous BCD words which had been stored in register 66 are shifted successively into register 68. Similarly, while register 68 is loaded, the BCD words previously stored therein are shifted successively into register 70. Thus, when the weight data presently sampled by analog-to-digital converter 58 is fully stored in register 66, the immediately preceding weight data is stored in register 68 and the oldest sample of weight data is stored in register 70.

Averaging circuit 72 then determines the average value of the samples of weight data stored in registers 66, 68 and 70. As mentioned previously, the adding circuit included in averaging circuit 72 arithmetically adds the weight representations stored in registers 66, 68 and 70. Then, the summed weight data is divided by the number of registers, in this example, by the factor 3. The resultant binary signal, which may be formed of five BCD words, represents the average value of the last three samples of weight data produced by analog-to-digital converter 58.

The averaged weight data, as produced by averaging circuit 72, is supplied to comparator circuit 74 and, more particularly, to both of the gated storage units which may be included in the comparator circuit. Suitable timing pulses from clock unit 100 are used, either directly or after suitable frequency division, to enable first one and then the other of the gated storage units. As mentioned previously, the clock rate at which these gated storage units are enabled may be quite different from the clock rate at which weight data is loaded into registers 66, 68 and 70 or the clock rate at which average circuit 72 is operable. Thus, not every averaged weight data need be supplied or gated into comparator circuit 74. Nevertheless, this "loss" of averaged weight data does not affect the operation of comparator circuit 74, zero and weight stores 80 and 82 or subtracting circuit 96. It should be understood that even though some averaged weight data may not be gated into comparator circuit 74, each averaged weight data sample which is gated into the comparator circuit will be considered as a respective one of "successive" averaged weight samples.

As mentioned previously, comparator circuit 74 compares the latest averaged weight sample stored in one gated storage unit to the next preceding averaged weight sample stored in the other gated storage unit. This can be achieved by subtracting one stored sample from the other stored sample. The decoder circuit which also may be included in comparator circuit 74 determines whether the difference between the stored averaged weight samples is less than or greater than a predetermined number. If less than the predetermined number, the decoder circuit applies an enable signal to output terminal 76 of comparator circuit 74. Conversely, if the difference between the stored weight samples is greater than the predetermined number, the decoder circuit produces an enable signal at output terminal 78 of comparator circuit 74.

The averaged (or change in the averaged) weight data produced by averaging circuit 72 is applied to data input terminals 88 and 92 of zero store 80 and of weight store 82, respectively. In one embodiment, both stores 80 and 82 are enabled to store the supplied averaged (or change in the averaged) weight data during synchronized timing intervals as determined by clock pulses supplied to these storage circuits by clock unit 100 if the change in the averaged weight is less than the aforementioned predetermined number, but only weight store 82 is enabled to store the change in the averaged weight if this change is greater than the predetermined number.

Before a parcel is placed upon weighing platform 12, but after power supply switch 18 is operated, an operator will actuate reset key 28 which, in turn, closes reset switch 94, shown in FIG. 4. This closing of reset switch 94 completes a circuit from a source of operating voltage to enable input terminal 84 of zero store 80 and to enable input terminal 89 of weight store 82. It is appreciated that, even in the absence of a parcel placed upon weighing platform 12, the platform itself exerts a force on flexure element 51. Thus, weight data is supplied to data bus 64 by analog-to-digital converter 58, this weight data representing the quiescent condition of load cell 50. In other words, in the absence of a parcel, the weight data supplied to data bus 64 represents the reference, or zero level against which a parcel is weighed. When reset switch 94 is closed to apply an enable signal to zero store 80, and to weight store 82, the averaged weight data produced by averaging circuit 72 and supplied to data input terminals 88 and 90, respectively, is stored in zero store 80 and in weight store 82.

Once reset switch 94 is opened, comparator circuit 74 operates to selectively determine whether the reference level stored in zero store 80 should be updated. For example, let it be assumed that after the initial reference level is stored in zero store 80 (and in weight store 82, a parcel is not placed upon weighing platform 12 for a prolonged period of time. During this period of time, various changes may occur in some of the electrical components, or residue may accumulate on weighing platform 12 or other factors may arise whereby the sampled weight data applied to data bus 64 may vary. Such variations are reflected in a change in the averaged weight data produced by averaging circuit 72. If this change is small, as described previously, comparator circuit 74 produces an enable signal at output terminal 76 so as to enable zero store 80 and weight store 82 to store this change in the averaged weight sample. Thus, the stored reference level is adjusted, or updated, to account for the aforementioned factors which may contribute to the change in the sampled weight data.

Now, let it be assumed that a parcel is placed upon weighing platform 12. As may be appreciated, this results in a very large change in the weight data supplied to data bus 74 by analog-to-digital converter 58. This large change in the sampled weight will be reflected in a large change in the averaged weight data produced by averaging circuit 72. Consequently, comparator circuit 74 applies an enable signal to output terminal 78, thereby enabling only weight store 82 to store the large change in the average weight data sample supplied thereto by averaging circuit 72. It is expected that a large change will be present in the averaged weight data produced by averaging circuit 72 until all of registers 66, 68 and 70 are loaded with the sampled weight of the parcel. Thus, weight store 82 will be updated until all of the registers are loaded, thereby storing an accurate approximation of the actual weight of the parcel (plus the weight of the weighing platform), as such weight exerts a force on flexure element 51. If subsequent changes in the sampled weight applied to data bus 64 are relatively small, such changes will be used to update the reference level stored in zero store 80 and also the data stored in weight store 82, thereby maintaining a correct measure of the parcel weight at the output of subtracting circuit 96, notwithstanding these small changes. However, if such changes are relatively large, they will be used to update the data stored in weight store 82 only. That is, it is assumed that small changes in the sampled weight, and thus the averaged weight data, merely are due to a variation in the zero or reference level; whereas large changes in the sampled weight, and thus in the averaged weight data, are caused by placing a parcel upon weighing platform 12 and should be loaded into weight store 82.

Subtracting circuit 96 subtracts the zero or reference level stored in zero store 80 from the total weight stored in weight store 82. The difference is supplied to leads on weight bus 98 and represents the actual parcel weight. This parcel weight signal may be formed of five parallel-bit BCD words (D1-D5), in accordance with the convention adopted hereinabove for analog-to-digital converter 58.

Even if reset switch 94 is not closed in advance of each weighing operation, a correct reference level will be stored in zero store 80 prior to performing the weighing operation so as to account for slow changes in that reference level. This is because the contents of the zero store will be updated when an enable signal is supplied thereto by comparator circuit 84 when slow or small changes in weight are detected. Furthermore, the reference level stored in zero store 80 need not be limited solely to a zero level. For example, if a standard weight is placed upon weighing platform 12, an average value of this weight is stored in zero store 80 when reset switch 94 is closed. Hence, this standard weight may correspond to the reference level stored in the zero store.

In another embodiment of the apparatus shown in FIG. 4, the reference level stored in zero store 80 is inhibited from being updated by slow changes in the averaged weight samples when a parcel, or load, is placed upon weighing platform 12. This is achieved by providing a latching circuit which is latched when an enable signal is provided at output terminal 78 of comparator circuit 74, thereby inhibiting changes in the averaged weight data from being supplied to zero store 80. This latching circuit can be unlatched, or cleared, when reset switch 94 is closed. As another alternative, the latching circuit can be cleared when the averaged weight data changes by a large negative amount, indicative of the removal of a parcel from weighing platform 12.

In yet another embodiment of the illustrated apparatus, registers 68 and 70 are omitted and averaging circuit 72 likewise is omitted. However, it is preferred to use the averaging circuit for "smoothing" spurious changes in isolated weight samples.

In yet another embodiment, the weight data on leads 98 are gated to a weight data storage device once weight store 82 is stabilized. This is achieved, for example, by providing a flip-flop circuit which is set in response to an enable signal provided at output terminal 78 of comparator circuit 74, and which is reset in response to an enable signal provided at output terminal 76. When the flip-flop circuit undergoes a transition from its set to its reset state, a gating pulse is generated to gate the weight data on leads 98 into the aforementioned storage device. Thus, even if the contents of zero store 80 and the contents of weight store 82 are modified subsequently, such modifications will not affect the weight data now stored in the additional storage device.

ARITHMETIC UNIT AND KEYBOARD ENCODER

Figure 5:
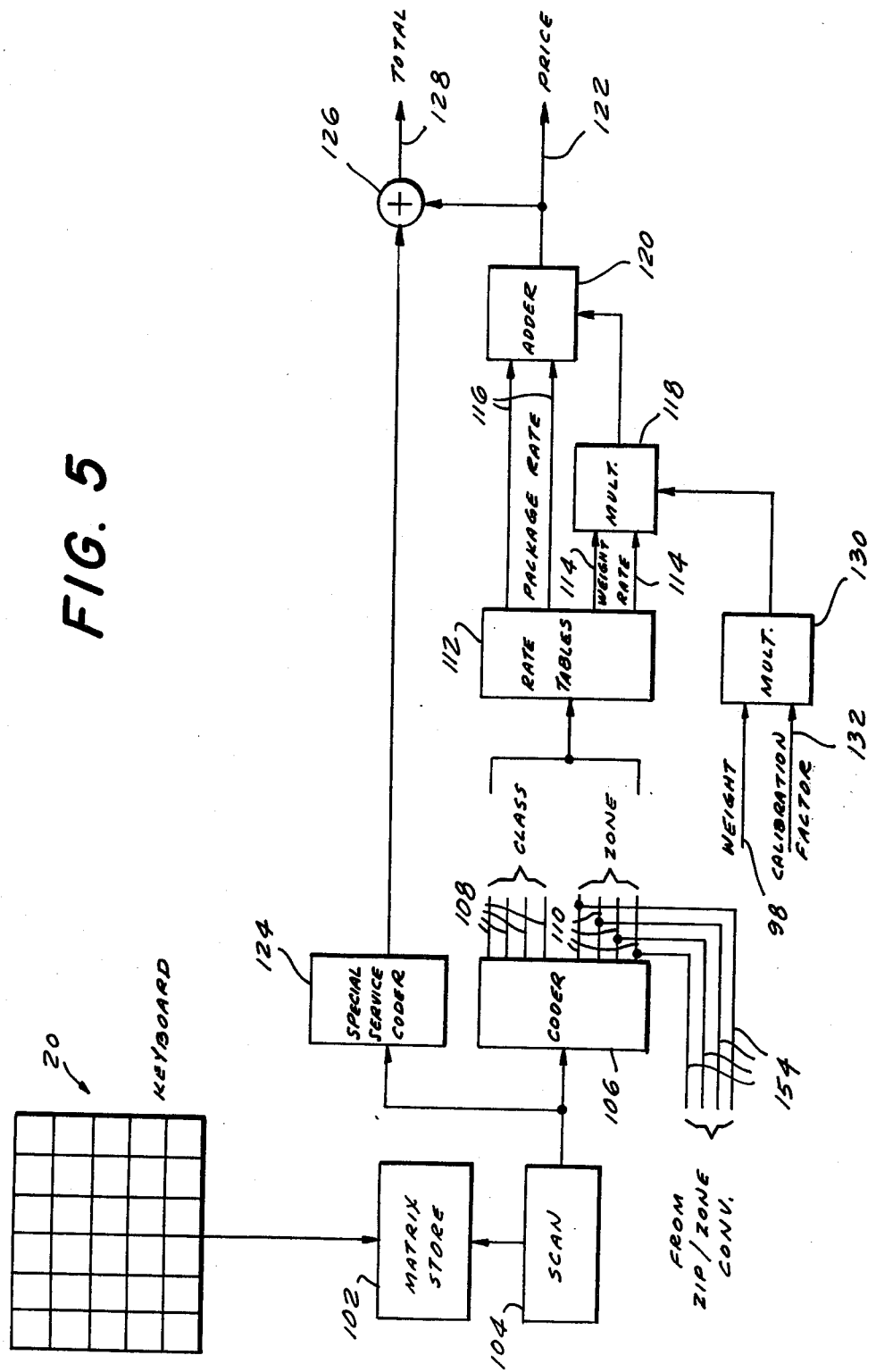
FIG. 5 is a logic block diagram showing the arithmetic unit depicted in FIG. 2.

Referring to FIG. 5, one embodiment of a keyboard encoder is comprised of a storage circuit 102, a scanning circuit 104 and an encoding circuit 106. An additional encoding circuit 124 also is provided. The purpose of the keyboard encoder is to determine which key element or elements of keyboard 20 is/are operated and to produce an encoded representation thereof, such as any suitable digital code, for example, a BCD code, of the operated key element.

Storage circuit 102 preferably is a matrix store having an individual storage compartment, or location, associated with each key element of keyboard 20. Each such storage location is adapted to store a predetermined binary signal (such as a "1" or "0") depending upon whether its associated key element is actuated. In one embodiment, and in order to minimize the number of conductors, or leads between keyboard 20 and matrix store 102, the signals representing the selected operation of each key element are supplied in multiplexed format to the matrix store.

Scanning circuit 104 is coupled to matrix store 102 and is adapted to scan each storage location in the matrix store to detect those locations representing an actuated key element. As one example, scanning circuit 104 may comprise a counter whose count is incremented in accordance with the successive storage locations which are scanned. Thus, each count of scanning circuit 104 identifies a respective key element. A gating circuit may be coupled between the counting circuit of scanning circuit 104 and encoding circuit 106, this gating circuit being selectively enabled when the scanning circuit detects a signal stored in a respective storage location of matrix store 102 representing the actuation of the corresponding key element. That is, when an actuated key element is detected, the identity thereof, as determined by scanning circuit 104, is gated into encoding circuit 106.

Encoding circuit 106 is responsive to the identity of an actuated key element, as represented by the output of scanning circuit 104, to produce an encoded representation of the actuated key element, which encoded representation is compatible with the remaining circuitry illustrated in FIG. 5, and to be described below. For the purpose of the present discussion, encoding circuit 106 is simplified so as to be provided with a set of class outputs 108 for providing an encoded representation of a selected class-of-service key 22 (FIG. 1) and a set of zone outputs 110 for providing an encoded representation of a selected numeric key 24. Although different sets of outputs 108 and 110 are shown, such outputs may be combined into a single set of outputs for providing selected, encoded representations of class-of-service and destination zone. As will be described presently, the class and zone codes produced by encoding circuit 106 are used as address signals in conjunction with the operation of the arithmetic unit.

Although not shown in FIG. 5, encoding circuit 106 also may include a detecting circuit to determine whether an improper destination zone has been selected for a particular class of service. An example of such a detecting circuit is the zone comparator described in copending application Ser. No. 652,820. If an improper zone is detected, the output of encoding circuit 106 is inhibited from being applied to further circuitry. To this effect, suitable output gating circuits may be employed.

Also shown in FIG. 5 is a special service encoding circuit 124. Encoding circuit 124 may be similar to encoding circuit 106 and is coupled to the output of scanning circuit 104. The purpose of the special service encoding circuit is to detect whether one of special services keys 26 (FIG. 1) is actuated. If a special services key is operated, special service encoding circuit 124 is operable to respond to the actuation of numeric keys 24 so as to produce an encoded representation of an aforementioned special service fee. This encoded special service fee is applied to the arithmetic unit together with the previously mentioned address formed of class and zone data, as produced by encoding circuit 106.

The arithmetic unit is comprised of a storage circuit 112, a multiplying circuit 118, an adding circuit 120 and an additional adding circuit 126. Storage circuit 112 preferably is a read only memory (ROM) and, desirably, a programmable read only memory (PROM). PROM 112 is a so-called look-up table formed of individually addressable memory locations wherein data corresponding to the postage rate per unit parcel weight and data corresponding to the base package rate of each destination zone in each class of service are stored. The advantage in constructing this look-up table as a PROM is to facilitate changes in the stored data in the event of revisions in the various postal rates. PROM 112 includes a set of output terminals 114 for providing an encoded representation of the weight rate corresponding to the class and zone address produced by encoding circuit 106. Hence, as shown, PROM 112 is coupled to encoding circuit 106. The PROM also includes a set of output terminals 116 for providing an encoded representation of the package rate corresponding to the class and zone address. Thus, depending upon the particular address produced by encoding circuit 106, PROM 112 is operable to read out the weight and package rates stored therein and associated with the selected class and zone.

Weight rate output terminals 114 are coupled to multiplier 118. This multiplier may be similar to the aforedescribed multiplier circuit and is further adapted to receive the weight data supplied to leads 98 (FIG. 4). Accordingly, multiplier 118 produces a digital signal corresponding to the product of the weight data and the weight rate provided on leads 98 and output terminals 114, respectively.

The output of multiplier 118 is coupled to adding circuit 120 for supplying the digital signal thereto representing a portion of the postage required to ship the parcel having the weight as indicated on leads 98 to the selected destination zone via the selected class of shipment. Adding circuit 120 also is coupled to output terminals 116 for receiving the base package rate read out of PROM 112 in accordance with the class and zone address produced by encoding circuit 106. This package rate is added to the postage determined by multiplier 118 so as to produce a digital representation of the postage required for shipping that parcel. This digital signal is applied to a price bus 122 and, in addition, to adding circuit 126.

Adding circuit 126 also is coupled to special service encoding circuit 124 and is adapted to receive therefrom a representation of an additional special service fee, such as an insurance fee, a COD fee, etc. Adding circuit 126 is adapted to add this special service fee to the postage data produced by adding circuit 120 so as to provide a digital signal representing the total requisite postage. This total postage signal is supplied to a total price bus 128.

The operation of the apparatus illustrated in FIG. 5 now will be summarized. Matrix store 102 stores representations of which of the individual key elements in keyboard 20 have been operated. Thus, predetermined signals representing which of the class-of-service keys 22, which of the numeric keys 24 and which of the special services keys 26 have been operated are stored in the matrix store. Scanning circuit 104 scans the individual storage locations in matrix store 102 so as to identify the particular key elements which have been actuated. When scanning circuit 104 detects a selected class of service, encoding circuit 106 responds thereto to produce an encoded representation of the selected class at output terminals 108. Similarly, when scanning circuit 104 detects which destination zone has been selected, that is, by detecting which of the numeric keys 24 has been operated, encoding circuit 106 produces an encoded representation of the selected zone at output terminals 110. The combined class and zone representations are used as an address for PROM 112. Consequently, the PROM reads out the postal weight rate and package rate corresponding to the selected class and zone. The weight rate at output terminals 114 is multiplied in multiplier 118 by the weight data provided on leads 98. The resultant postage associated with this weight is added in adding circuit 120 to the package rate data read out from PROM 112 and provided at output terminals 116 so as to apply a postage price indication at price bus 122.

If scanning circuit 104 also detects the operation of a special services key 26, special services encoding circuit 124 is responsive to this selection of a special service and also to the actuation of numeric keys 24 (representing a special service fee) to supply a digital representation of the special service fee to adding circuit 126. This special service fee is added to the postage price produced by adding circuit 120 to apply a total price signal to total price bus 128. Although not shown specifically in FIG. 5, adding circuit 126 may be selectively operable only if the ADD key included in special services keys 26 is actuated. Alternatively, but having the same effect, the output of adding circuit 126 may be coupled to total price bus 128 via a gating circuit which is selectively enabled in response to the actuation of the ADD key. Also, and in conjunction with the selective application of data either to the price bus 122 or to the total price bus 128, the output of adding circuit 120 may be coupled to price bus 122 via a similar gating circuit. A latching circuit, such as a flip-flop circuit, may be used to determine whether the calculated postage data is applied to price bus 122 or to total price bus 128. For example, the flip-flop circuit normally may assume a reset, or cleared, condition, whereby the postage price data produced by adding circuit 120 is gated onto price bus 122 while inhibiting the output of adding circuit 126 from being gated onto total price bus 128. When the ADD key is actuated, the flip-flop circuit is set so as to disable the gating circuit provided between adding circuit 120 and price bus 122, while enabling the gating circuit which is provided between adding circuit 126 and total price bus 128. This flip-flop circuit then may be reset when the parcel is removed from weighing platform 12 and/or when reset switch 28 (FIG. 1) is operated. As a further example, if the aforementioned gating circuits are used, price bus 122 and total price bus 128 may be combined into a single bus for providing data representing the calculated postage for the parcel in accordance with the selected class, destination zone and special service.

As shown in FIG. 5, the weight data provided on leads 98 is supplied to multiplying circuit 118 through an additional multiplying circuit 130, the latter being supplied with a calibration factor on leads 132. The purpose of this additional multiplying circuit and the calibration factor now will be described.

SCALE CALIBRATION

As often occurs with weighing mechanisms, the postage scale may require recalibration from time to time. That is, if a standard weight is placed upon weighing platform 12, the weight displayed by weight display elements 32 may differ from that standard weight. In the mechanisms heretofore used, the calibration needed for providing a correct weight indication necessitated the careful adjustment of various mechanical and/or electrical components. Such a recalibration operation was time-consuming and often inaccurate. The circuitry shown in FIG. 6 obviates such manual adjustments, and provides an automatic recalibration of the scale.

The calibrating circuitry is comprised of an encoding circuit 134, a dividing circuit 136 and a storage circuit 138. Encoding circuit 134 may be similar to aforedescribed encoding circuit 106 or encoding circuit 124. The purpose of encoding circuit 134 is to provide a digital representation of a weight as selected by the operation of numeric key elements 24. Accordingly, encoding circuit 134 includes a first input terminal adapted to receive a signal which is produced when a calibration operation is to be performed, and another input terminal adapted to receive indications of the particular numeric key elements 24 which have been operated to perform this calibration operation. In one embodiment, the calibrate input terminal of encoding circuit 134 is coupled to a corresponding calibrate key element provided on keyboard 20, and the numeric key input terminals, hereinafter the keyed weight terminals, are coupled to numeric keys 24. In an alternative embodiment, the keyed weight input terminals of encoding circuit 134 are coupled to the output of scanning circuit 104. In this alternative embodiment, the calibrate signal which is applied to the calibrate input terminal of encoding circuit 134 also is applied as an inhibit signal to encoding circuits 106 and 124 of FIG. 5. Accordingly, encoding circuit 134 is adapted to produce an encoded representation of the keyed in weight corresponding to the particular numeric keys 24 which are operated during a calibration operation. Preferably, the data format of the encoded representation of the keyed in weight is identical to the data format of the weight data provided on leads 98. That is, the representation of the keyed in weight is comprised of a multiplexed BCD signal formed of five parallel BCD words corresponding to decimal digits D1, D2, ... D5.

The output of encoding circuit 134 is coupled to divider circuit 136. As shown, leads 98 also are coupled to divider circuit 136 for supplying the weight data thereto as measured by the aforedescribed weight determining circuitry shown in FIG. 4. Thus, the weight data supplied to divider circuit 136 via leads 98 represents a standard, calibrating weight which is applied to weighing platform 12. Dividing circuit 136 may be a conventional binary divider, as described hereinabove, to produce a digital output signal representing the quotient of the keyed in weight divided by the measured weight.

The output of divider circuit 136 is coupled to storage circuit 138 wherein the quotient determined by the divider circuit is stored. Accordingly, storage circuit 138 may comprise a storage register, an addressable register, or the like. Preferably, storage circuit 138 is selectively enabled to store the output of divider circuit 136, hereinafter the calibration factor, only if a calibration operation is being performed. Hence, storage circuit 138 may include an enable input terminal for receiving the calibration signal applied to encoding circuit 134. Thus, the calibration factor stored in storage circuit 138 is revised, or updated, only during recalibration of the scale. The revised calibration factor is maintained within storage circuit 138 and is supplied via leads 132 to multiplier 130 (FIG. 5) whereat it is used to multiply the weight data provided at leads 98 during subsequent postage calculation operations.

The manner in which a calibration operation is performed will best be understood in conjunction with a numerical example. Let it be assumed that a standard ten pound weight is placed upon weighing platform 12. In accordance with the aforementioned assumption wherein scale resolution corresponds to a least significant bit representing 1/16 ounces, the standard ten pound weight should correspond to a count of 2560. This would be represented by the multiplexed BCD data on leads 98 as follows:

| D1 | D2 | D3 | D4 | D5 |
|------|------|------|------|------|
| 0001 | 0000 | 0000 | 0000 | 0000 |

However, let it be assumed that the actual weight data which is provided on leads 98 corresponds to a count of 2500. In the multiplexed BCD convention, this would be represented as follows:

| D1 | D2 | D3 | D4 | D5 |
|------|------|------|------|------|
| 0000 | 1001 | 0001 | 0010 | 0100 |

Thus, although a standard ten pound weight is placed upon weighing platform 12, the weight data provided on leads 98 corresponds to a weight of 9 pounds, 12¼ ounces.

In the calibration operation, a suitable calibrate key is operated and numeric keys 24 are selectively actuated to produce a representation of the ten pound weight. Encoding circuit 134 responds to the calibrate signal and to the actuated numeric keys to produce an output representation of ten pounds. Thus, encoding circuit 134 produces a digital signal corresponding to a count of 2560, which is indicated by the multiplexed BCD signal shown above. This signal produced by encoding circuit 134 is divided by the actual weight data provided on leads 98. That is, in this example, the keyed-in standard weight of ten pounds corresponds to a count of 2560 which is divided by the measured weight which corresponds to a count of 2500. In this example, the quotient is equal to 1.024 in the decimal system, and this quotient is the calibration factor which is stored in suitable digital or binary code in storage circuit 138.

The calibration factor stored in storage circuit 138 remains therein until a subsequent calibration operation is performed. This stored calibration factor is supplied to multiplying circuit 130 (FIG. 5) via leads 132 so as to multiply the actual weight data provided on leads 98 so as to produce a correct, or recalibrated representation of the parcel weight. This corrected weight data is supplied from multiplying circuit 130 to multiplying circuit 118. Thus, following a calibration operation, all subsequent weight measurements are multiplied by the determined calibration factor so as to provide a correct representation of parcel weight.

Figure 6:
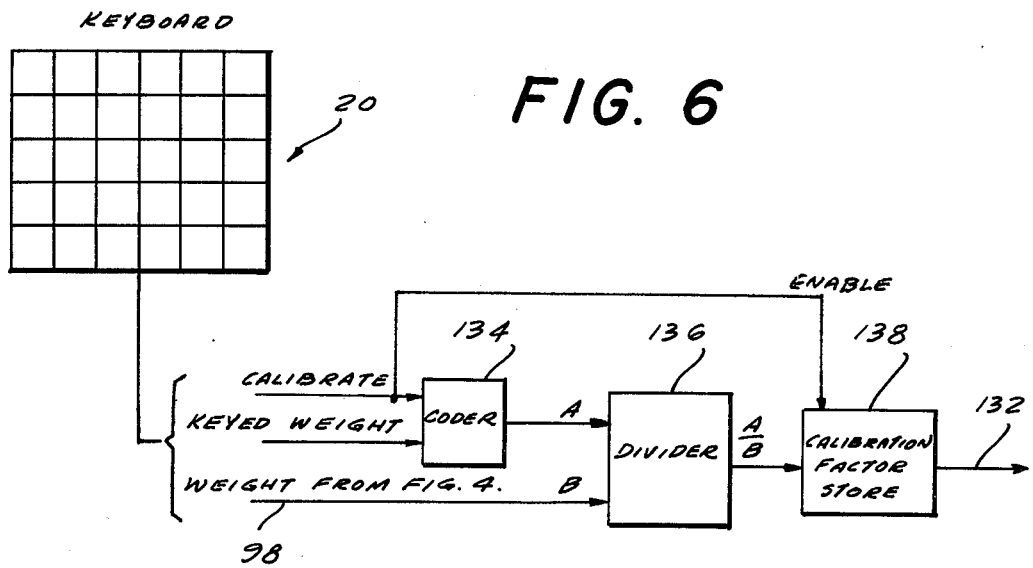
FIG. 6 is a logic block diagram showing the automatic calibration apparatus used with the postage scale of FIG. 1.

It is appreciated that the calibration operation which is carried out by the circuitry shown in FIG. 6 is a simple, effective technique for recalibrating the postage scale. This circuitry is not susceptible to the errors previously associated with the manual adjustments of various mechanical or electrical components. Furthermore, this calibration operation is carried out speedily, thereby making the postage scale available for its intended use.

ZIP-TO-ZONE CONVERSION

Figure 7:
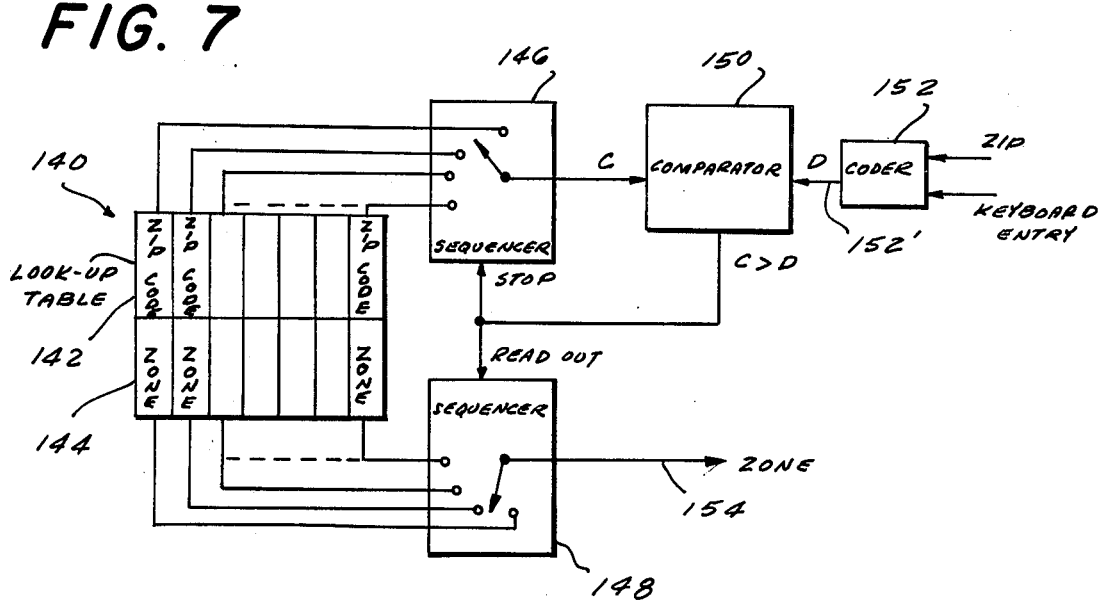
FIG. 7 is a logic block diagram showing a ZIP code to zone converter which can be used with the postage scale of FIG. 1.

As mentioned previously, the destination zone for shipping a parcel generally is indicated by actuating a selected one of numeric keys 24 corresponding to that zone. However, it is anticipated that in some instances, the ZIP code of the destined address will be known but the associated zone will not. The present apparatus is provided with a ZIP code to zone converter whereby the proper zone is determined in response to the entry of ZIP code data. One embodiment of such a converter is shown in FIG. 7.

As illustrated, the ZIP-to-zone converter is comprised of a read only memory 140, such as a PROM, having two storage sections 142 and 144, sequencer circuits 146 and 148, a comparator circuit 150 and an encoding circuit 152. Section 142 of PROM 140 is comprised of a plurality of storage locations, each location storing an encoded representation of ZIP code information. Storage section 144 of PROM 140 likewise is comprised of a plurality of storage locations, each such location in section 144 being associated with a respective location in section 142, and the locations in section 144 being provided with stored zone information. More particularly, and in accordance with convention, various ZIP code prefixes, that is, the first three digits of a ZIP code, are associated with various zones. A partial table of this association originating from, for example, New York City, is as follows:

| ZIP code | zone | ZIP code | zone | ZIP code | zone | ZIP code | zone |
|---|---|---|---|---|---|---|---|
| 006–009 | 7 | 100–118 | 1 | 255–266 | 4 | 394–396 | 6 |
| 010–013 | 2 | 119–127 | 2 | 267 | 3 | 397 | 5 |
| 014 | 3 | 128–136 | 3 | 268–288 | 4 | 400–402 | 5 |
| 015–018 | 2 | 137–139 | 2 | 289 | 5 | 403–406 | 4 |
| 019 | 3 | 140–149 | 3 | 290–293 | 4 | 407–409 | 5 |

Each location of section 142 of PROM 140 is provided with the so-called ZIP code "break points" associated with each grouping set out in the above table. As an example, the first location in section 142 stores a representation of ZIP code "009", the break point of the first group. The second location in section 142 stores a representation of ZIP code "013", the break point in the second ZIP code group. The third location in section 142 stores a representation of ZIP code "014", the fourth location in section 142 stores a representation of ZIP code "018", and so on. Each location in section 144 of PROM 140 stores a representation of the zone associated with the ZIP code whose break point information is stored in the associated location in section 142. Thus, the first location in section 144 stores a representation of zone 7. The second location in section 144 stores a representation of zone 2. The third location in section 144 stores a representation of zone 3, and so on.

Sequencer circuits 146 and 148 are diagrammatically represented as selector switches, hereinafter sequencer switches. The sequencer switches may be formed of scanning circuits, such as scanning circuit 104 described hereinabove with the respect to FIG. 5. As another example thereof, sequencer switches 146 and 148 may be formed as sequential address generators, each adapted to generate the addresses of the various storage locations of sections 142 and 144, respectively, successively and in sequence. Thus, both sequencer circuits are adapted to address, or access, the first location in each of sections 142 and 144, followed by the second location in each of these sections, followed by the third location in each section, and so on. The sequencer switches are operable in unison so as to advance substantially simultaneously from one to the next storage location in sections 142 and 144. As sequencer switch 146 advances successively so as to access individual storage locations in section 142, the encoded ZIP code data stored in each accessed location is read out therefrom and supplied to comparator circuit 150. Sequencer switch 146 includes a disable, or "stop" input terminal which is coupled to an output of comparator circuit 150 and which is energizable to halt further accessing of section 142 by this sequencer switch.

Sequencer switch 148 similarly accesses successively the individual storage locations in section 144 of PROM 140. However, the encoded zone data stored in each location of section 144 is not read out therefrom by the sequencer switch until an enable, or "read out" signal is supplied thereto. Accordingly, sequencer switch 148 includes an enable input terminal coupled to the output of comparator circuit 150.

Comparator circuit 150 includes another input coupled via leads 152' to encoding circuit 152. The purpose of the comparator circuit is to determine whether a ZIP code prefix, as entered via numeric keys 24, is less than or greater than the ZIP code prefix which is supplied to the comparator circuit from PROM 140 by sequencer switch 146. Accordingly, comparator circuit 150 may include suitable storage units for storing the accessed ZIP code information provided by sequencer switch 146 and for storing the manually entered ZIP code information as provided by numeric keys 24 and encoding circuit 152. Comparator circuit 150 additionally includes a subtractor circuit for subtracting the accessed ZIP code information from PROM 140 from the keyboard entered ZIP code information. When comparator circuit 150 detects that the accessed ZIP code information is equal to or greater than the keyboard entered ZIP code information, an output signal is produced thereby and is supplied as a disable signal to sequencer switch 146 and as an enable signal to sequencer switch 148.

Encoding signal 152 may be of the type described previously in conjunction with encoding circuits 106, 124, or 134. Encoding circuit 152 includes an enable input terminal adapted to be supplied with a signal when the ZIP key element is operated and to receive signals corresponding to the particular numeric keys 24 which are selectively actuated by an operator to key in ZIP code information. In one embodiment thereof, the signal produced when the ZIP key element is actuated may be supplied to encoding circuit 152 via leads 108 of encoding circuit 106 (FIG. 5). Similarly, the numeric information supplied to encoding circuit 152 may be produced at output terminals 110 of encoding circuit 106. Accordingly, when a ZIP-to-zone conversion is to be performed, encoding circuit 152 is enabled in response to the actuation of the ZIP key element so as to produce an encoded representation of the selected numeric keys 24 corresponding to the ZIP code destination.

In operation, sequencer switches 146 and 148 initially select the first location in each of sections 142 and 144, respectively. However, the ZIP code and zone data stored in these sections are not read out therefrom or utilized until a ZIP-to-zone conversion operation is to be performed. When an operator wishes to effect a ZIP-to-zone conversion, as when the operator is not aware of the destination zone but does know the destination ZIP code, the ZIP key element is actuated so as to enable encoding circuit 152. Then, the actuation of numeric key elements 24 corresponding to the destination ZIP code prefix transmits corresponding keyboard signals to encoding circuit 152, whereupon the keyed in ZIP code data is encoded to a form compatible with comparator circuit 150. The encoded destination ZIP code prefix is supplied via leads 152' to the comparator circuit. Such encoded ZIP code information may take the form of BCD codes, binary codes, or other conventional digital codes.

When encoding circuit 152 supplies an encoded representation of a destination ZIP code to comparator circuit 150, a gating circuit (not shown) is triggered to initiate the operation of sequencer switches 146 and 148. Accordingly, the first location in section 142 is read out therefrom via sequencer switch 146 and is compared to the encoded destination ZIP code in comparator circuit 150. If the read out ZIP code data is less than the destination ZIP code data, sequencer switches 146 and 148 are advanced so as to access the second location in sections 142 and 144. The stored ZIP code information in section 142 then is read out through sequencer switch 146 and is compared in comparator circuit 150 to the destination ZIP code information. Again, if the read out ZIP code information is less than the destination ZIP code information, sequencer switches 146 and 148 are advanced to access the next location in sections 142 and 144. This operation continues until the read out ZIP code information is equal to or greater than the destination ZIP code information. In accordance with the foregoing ZIP/zone table, the destination ZIP code is included in the ZIP code group associated with the break point which is read out from section 142 when the read out data is equal to or greater than the destination ZIP code. For example, if the destination ZIP code prefix is "016", comparator circuit 150 will detect that the ZIP code data read out from the first three locations in section 142 are less than the destination ZIP code data. However, the ZIP code data read out of the fourth location of section 142 is equal to "018" which is greater than the destination ZIP code of "016." Thus, when sequencer switches 146 and 148 access the fourth storage location in each of sections 142 and 144, comparator circuit 150 produces an output signal which is supplied as a disable signal to sequencer switch 146 and which is supplied as an enable signal to sequencer switch 148.

Upon receiving the disable signal from comparator circuit 150, sequencer switch 146 halts further operation thereof. At the same time, the enable signal supplied to sequencer switch 148 enables this sequencer switch to read out the zone information stored in the accessed location in section 144. In accordance with the foregoing example, the fourth location in section 144 is accessed, thereby reading out a representation of zone 2. This representation, which may be in the form of a BCD code, is supplied via leads 154 to, for example, PROM 112 (FIG. 5). That is, the zone information read out from PROM 140 is used in place of the zone data which otherwise would have been produced by encoding circuit 106.

Thus, even though an operator might not know the destination zone of a parcel to be shipped, the correct zone nevertheless can be determined by the circuitry shown in FIG. 7; thereby obviating the necessity of resorting to various zone charts.

Since the particular zone associated with a ZIP code depends upon the origination of the parcel to be shipped, that is, the location of the postage scale described herein, it is appreciated that PROM 140 is programmed with ZIP code and zone information in accordance with a particular customer's site. That is, the same ZIP/zone information stored in PROM 140 for a postage scale to be used in, for example, New York City will not be the same information which is stored in PROM 140 for a postage scale which is to be used in, for example, Chicago.

Although not shown herein, it may be appreciated that sequencer switches 146 and 148 are actuated so as to access successive locations in sections 142 and 144 in response to suitable timing pulses. Such timing pulses may be applied thereto from any suitable source, such as timing control circuit 48 (FIG. 2), clock unit 100 (FIG. 4), or the like. Still further, the zone representations provided on leads 154 by sequencer switch 148 may, if desired, be stored in a suitable storage unit, such as a register, addressable memory, or the like. Once stored therein, this zone representation can be used for the aforedescribed purposes, such as providing an address for the weight and package rate data stored in PROM 112 (FIG. 5). A detector circuit may be associated with such a storage device for detecting when this zone representation is stored therein and for generating a reset signal for resetting sequencer switches 146 and 148 to their respective initial accessing locations. Hence, the ZIP-to-zone converter shown in FIG. 7 is prepared for reuse to perform a subsequent ZIP-to-zone conversion.

DISPLAY CIRCUITRY

Figure 8:
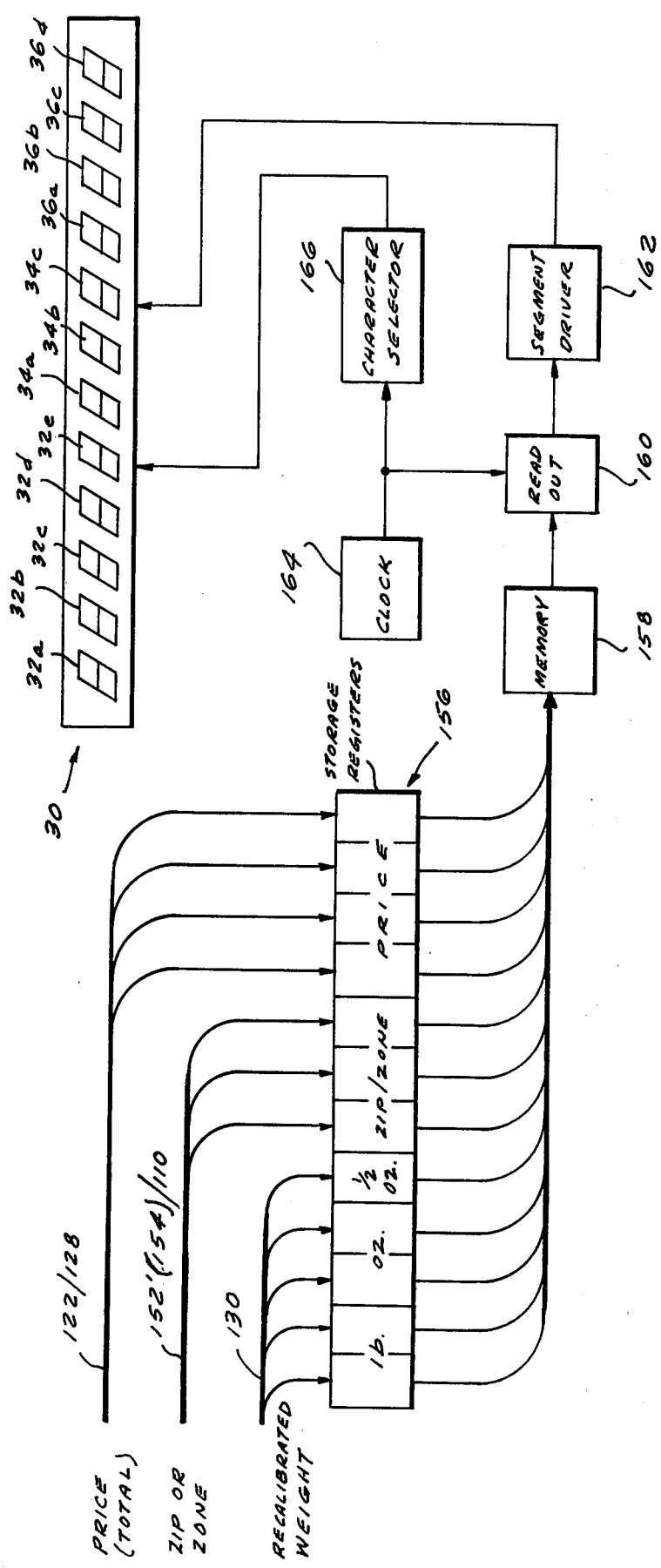
FIG. 8 is a logic block diagram of the display driver shown in FIG. 2.

The foregoing has described how the postage price (or total price), zone or ZIP code, and weight (or recalibrated weight) data is generated. The circuitry shown in FIG. 8 provides a visual display for this data in terms of price (dollars and cents), ZIP code or zone and weight (pounds, ounces and one-half ounces). As shown, this circuitry is comprised of storage registers 156, a memory unit 158, a read out circuit 160, a segment driver 162, a clock circuit 164 and a character selector 166. Segment driver 162 and character selector 166 are coupled to the various display elements described previously in connection with FIG. 1. Storage registers 156 are comprised of individual storage compartments, each compartment being associated with a corresponding display element included in display 30. Each storage register is adapted to store digital data which is to be displayed. As an example, storage registers 156 are divided into a weight storage section, a ZIP/zone storage section and a postage price storage section. More particularly, the weight storage section includes a compartment for storing data repesenting tens of pounds, another compartment storing data representing units of pounds, another compartment storing data representing tens of ounces, another compartment storing data representing units of ounces and a fifth compartment storing data representing one-half ounces. The ZIP/zone section includes a compartment for storing zone data. If a destination zone is not known and a ZIP-to-zone conversion is necessary, as described above, this section of storage registers 156 includes three compartments for storing the respective digits constituting the ZIP code prefix which is keyed in via numeric keys 24, as described with respect to FIG. 7. The price section of storage registers 156 is divided into a compartment for storing data representing tens of dollars, another compartment for storing data representing units of dollars, another compartment for storing data representing tens of cents and a fourth compartment for storing data representing units of cents.

In order to receive the data described hereinabove, the weight section of storage registers 156 is coupled to the output of multiplier circuit 130 (FIG. 5) via a suitable bus. Similarly, the ZIP/zone section of storage registers 156 is coupled to leads 152' for receiving ZIP code data and to leads 154 for receiving zone representations. Although not shown herein, suitable gating circuitry may be provided to selectively couple leads 152' and leads 154 to the ZIP/zone section of storage registers 156 depending upon whether or not a ZIP-to-zone conversion operation is performed. The price section of storage registers 156 is coupled to postage price bus 122 or to total postage price bus 128, described previously with respect to FIG. 5. As mentioned during that foregoing description, suitable gating circuitry may be provided to selectively couple either price bus 122 or total price bus 128 to the price section of storage registers 156 depending upon whether or not a special service fee is added to the postage price. It may be appreciated that price bus 122 can be omitted so that the price section of storage registers 156 is coupled to total price bus 128 only.

Storage registers 156 are coupled to memory unit 158. In a preferred embodiment, the memory unit is provided with a number of locations equal to the number of compartments included in storage registers 156. In one commercial embodiment, memory unit 158 is comprised of a 32 × 6 storage device. That is, the storage device includes 32 compartments, each having a 6-bit capacity. While this provides more storage capacity than may be necessary, such a 32 × 6 storage device is readily available at commercially economical costs. To be compatible with such a memory device, storage registers 156 may be provided with sixteen individual compartments, even though a smaller number (for example, twelve) of such compartments are used to store data. The remaining compartments may be provided with blanking signals which are used, in turn, to blank selected display elements, thereby providing satisfactory visual spacing between adjacent groups of displayed data. Furthermore, each compartment included in storage registers 156 may be adapted to store a parallel 6-bit data word. Accordingly, the 32 × 6 memory device included in memory unit 158 will be capable of storing four successive samples of all of the data (2 × 16) stored in the sixteen compartments of storage registers 156.

Memory device 158 is coupled through a multiplexing read out circuit 160 to segment driver 162. Read out circuit 160 is, in turn, driven by clock circuit 164 so as to read out the data stored in successive compartments in memory device 158. Accordingly, each data word which is read out of memory device 158 is adapted to be supplied to segment driver 162 for selectively energizing the segments included in selected ones of the elements constituting display 30. As one example, each display element may comprise a typical 7-segment element, such as a liquid crystal display. Accordingly, segment driver 162 comprises a signal decoder for decoding each data word read out of memory device 158 so as to drive corresponding segments of the 7-segment element.

Clock circuit 164 also is coupled to character selecting circuit 166. The character selecting circuit is adapted to select which of the elements constituting display 30 is to be energized by segment driver 162. As shown, both read out circuit 160 and character selecting circuit 166 are driven in common by clock circuit 164, thereby selecting successive ones of the 7-segment elements in synchronism with the successive data words read out of memory device 158.

In order to simplify the description of the operation of the display circuitry shown in FIG. 8, it will be assumed that display 30 does not include any elements which remain blanked so as to separate the various display sections thereof. Similarly, it will be assumed that storage registers 156 do not include a compartment which is supplied with blanking signals for maintaining such display elements permanently blank. Storage registers 156 may be considered to be buffer registers for receiving the weight data from multiplying circuit 130 (FIG. 5), the ZIP code data from leads 152' (FIG. 7), the zone data from leads 154 or output terminals 110 of encoding circuit 106 (FIG. 5), the postage price data from price bus 122 and the total postage price data from total price bus 128. The respective storage compartments of storage registers 156 may, if desired, be loaded asynchronously. Accordingly, and in accordance with the illustrated embodiment, the successive compartments of storage registers 156 are provided with pound data (tens and units), ounce data (tens and units), one-half ounce data, ZIP code data (three digit prefix) or zone data (single digit), dollars data (tens and units) and cents data (tens and units). When storage registers 156 are loaded, suitable gating circuitry (not shown) transfers the contents of such registers to memory device 158.

If memory device 158 is formed of a 32 × 6 memory circuit, such a circuit may be thought of as being comprised of two rows, each row corresponding to storage registers 156 and being formed of twelve (actually sixteen) columns (as illustrated in FIG. 8). The data stored in storage registers 156 may be shifted into the first row of memory device 158 and then successively through the second and third rows to the fourth row. In one embodiment, the data supplied to storage registers 156 is updated at various intervals. As the storage registers are updated, data stored therein is shifted into the first row of memory device 158, and the data previously stored in that first row is shifted into the second row, and so on.

In yet another alternative embodiment, memory device 158 is omitted and the contents of storage registers 156 are read out directly.

Read out circuit 160 is driven by clock circuit 164 and functions in a manner analogous to aforedescribed sequencer switches 146 and 148 so as to read out the data, in succession, stored in each compartment of, for example, the fourth row of memory device 158. If memory device 158 is omitted, read out circuit 160 is driven to read out the data stored in the first, then the second, then the third, etc. compartments in storage registers 156. As read out circuit 160 is advanced successively from one to the next compartment in memory device 158, character selecting circuit 166 is driven similarly so as to advance from one to the next display element included in display 30. That is, when the first compartment in memory device 158 (or storage registers 156) is read out, the first element 32a is selected for energization. When the second compartment of memory device 158 (or storage registers 156) is read out, the next element 32b is selected for energization. The compartment selected for read out and the character selected for energization are advanced successively and in synchronism until all of the compartments are read out and all of the display elements are selected.

When character selecting circuit 166 selects element 32a, the particular segments in that element are selectively energized by segment driver 162 in accordance with the data read out of the first compartment in memory device 158. Similarly, when character selecting circuit 166 selects element 32b, the segments of that element are selectively energized by segment driver 162. This operation continues until the last element 36d is selectively energized by segment driver 162. Then, the foregoing cycle of selecting and energizing successive display elements is repeated. Thus, element 32a is selectively energized to display the ten pound digit corresponding to the data stored in the ten pound compartment of storage registers 156. Display element 32b is selectively energized to display the units pound digit stored in the units pound compartment of storage registers 156. Element 32c is selectively energized to display the tens ounce digit stored in tens ounce compartment of storage registers 156; and so on until all of the data stored in storage registers 156 is displayed by display 30.

It may be appreciated that clock circuit 164 generates successive clock pulses at a rate such that display 30 is cyclically driven at a high enough speed so as to avoid any perceptible flicker in the displayed data.

Although the data stored in each storage compartment of storage registers 156 may be supplied to an associated segment driver, which, in turn, is coupled to a respective display element for driving same, such an arrangement would be far more expensive than the circuitry shown in FIG. 8.

As examples thereof, segment driver 162 may correspond to Model HM 7603-5 manufactured by Harris and character selecting circuit 166 corresponds to Model 145414 manufactured by Motorola Also, display 30 corresponds to Model BFO 8771, manufactured by Burroughs.

MICRO-PROCESSOR IMPLEMENTATION

While the foregoing description has been directed to certain preferred embodiments of electronic circuitry used in the construction of the electronic postal scale in accordance with the present invention, the functions performed by such circuitry can be implemented by a micro-processor. A block diagram of one embodiment of a micro-processor implementation is shown in FIG. 9. This implementation is comprised of a micro-processor unit 168, a random access memory (RAM) 170, a programmable read only memory (PROM) 172, a bus driver circuit 174, an interface circuit 176 and a clock circuit 178. Micro-processor unit 168 is comprised of Model 8080 A micro-processor manufactured by Intel Corp. of Santa Clara, California. This micro-processor unit is an 8-bit parallel central processing unit which includes six 8-bit addressable general purpose working registers and an accumulator. Address buses are provided between micro-processor unit 168 and RAM 170 and PROM 172. In addition, a data bus and an instruction bus are provided between the micro-processor unit and bus driver 174.

Micro-processor unit 168 is provided with a set of instructions for carrying out the aforedescribed operations (zero adjust, weight determining, postage calculations, scale calibration, ZIP-to-zone conversion and display driving) as will be described generally below. Such instructions determine the flow of data between various elements of the micro-processor unit, RAM 170, PROM 172 and bus driver 174.

RAM 170 may be comprised of one or more Model 2111A-4 random access memory devices manufactured by Intel Corp. The individually addressable memory locations within RAM 170 are selectively addressed by micro-processor unit 168, and the addressed location is adapted either to have data written therein via bus driver 174 or to have data read out therefrom, also via bus driver 174. The data applied to bus driver 174 is adapted to be transmitted either to micro-processor unit 168 or to interface circuit 174. Similarly, data from the micro-processor and/or interface circuit is adapted to be transmitted to bus driver 174 for further transmission, as indicated by the illustrated data channels.

PROM 172 may comprise a Model 2708 programmable read only memory, manufactured by Intel Corp. Such a programmable read only memory is adapted to store the various weight and package rates described previously in conjunction with PROM 112, and also to store the ZIP code and zone data previously discussed with respect to PROM 140 (FIG. 7). The data read out of PROM 172 is supplied to bus driver 174 and then to micro-processor unit 168.

Bus driver 174 may be comprised of Model 8228 system controller and bus driver, manufactured by Intel Corp. The bus driver is bi-directional to supply data to and from micro-processor unit 168 and to and from interface circuit 176. Also, the bus driver is adapted to supply data to be stored in addressed locations in RAM 170 as well as to provide data read out of RAM 170 and PROM 172 to micro-processor unit 168. Various instructions provided for micro-processor unit 168 are used for micro-processor control of the bus driver.

Interface circuit 176 may be comprised of Model 8255, manufactured by Intel Corp. The interface circuit is adapted to receive data from bus driver 174 and to supply such data to the display circuit shown, for example, in FIG. 8 and comprised of memory device 158, read out circuit 160, segment driver 162 and character selecting circuit 166. Interface circuit 176 also is adapted to receive various keyboard-entered signals, such as signals representing the selected actuation of various key elements provided in keyboard 20. As a further example, keyboard data supplied to interface circuit 176 may be generated by, for example, encoding circuit 106 (FIG. 4), encoding circuit 124 (FIG. 5), encoding circuit 134 (FIG. 6) and encoding circuit 152 (FIG. 7). Such encoding circuits may be included in a single, central encoder.

The interface circuit also is adapted to receive weight data supplied by analog-to-digital converter 58 (FIG. 3B). This weight data is supplied via bus driver 174 to micro-processor unit 168 for use in determining the correct postage for the weighed parcel and for controlling the data to be displayed by display 30.

Clock circuit 178 is adapted to provide suitable clock signals of appropriate frequency to micro-processor unit 168. In one embodiment thereof, clock circuit 178 is comprised of Model 8224 clock generator, manufactured by Intel Corp.

The general operation of the micro-processor implementation shown in FIG. 9 now will be described in general terms and in conjunction with various ones of the circuits discussed hereinabove. The weight data provided on bus 64 by analog-to-digital converter 58 (FIG. 3B) is supplied to interface circuit 176 and via bus driver 174 to micro-processor unit 168 in accordance with suitable micro-processor instructions whereby bus driver 174 is appropriately enabled. When a parcel is not placed upon weighing platform 12, the weight data supplied to interface circuit 176 represents the reference level. Micro-processor unit 168 addresses particular locations in RAM 170 wherein successive samples of this weight data is stored. Hence, such address locations in RAM 170 correspond to registers 66, 68 and 70, discussed previously with respect to FIG. 4.

To determine the average of the weight samples, the arithmetic unit included in micro-processor unit 168 is controlled to perform an averaging operation upon the weight samples stored in RAM 170. Accordingly, such stored samples are read out of RAM 170 under control of appropriate address signals generated by micro-processor unit 168, the read out samples being supplied by bus driver 174 to the arithmetic unit of the micro-processor unit. The averaged weight data then is stored in yet a further addressed location in RAM 170, as determined by suitable instructions in micro-processor unit 168.

When a parcel is placed upon weighing platform 12, the weight data provided on bus 64 by analog-to-digital converter 58 is applied through interface circuit 176 and bus driver 174 to micro-processor unit 168 and thence to addressed locations in RAM 170. The arithmetic unit of the micro-processor unit functions to perform an averaging operation upon the stored weight data, as discussed previously, and further instructions in the micro-processor unit are effective to have the arithmetic unit carry out a comparator operation to determine whether the averaged weight data differs from the next preceding averaged weight data by more or less than a predetermined number. Depending upon the results of this comparison, weight data is stored in a different addressed location in RAM 170, corresponding to weight store 82 (FIG. 4), or is used to update the reference level stored in a previously addressed location in RAM 170, corresponding to store 80. The data stored in the location in RAM 170 corresponding to weight store 82 and the data stored in RAM 170 corresponding to zero store 80 are read out from the RAM and supplied to the arithmetic unit in micro-processor unit 168 via bus driver 174. The arithmetic unit then is controlled by the micro-processor instructions to subtract the reference level data from the weight data, resulting in a representation of parcel weight similar to the weight provided on leads 98 (FIG. 4). This parcel weight then is used by micro-processor unit for determining postage.

The actuation of selected class-of-service keys 22 and numeric keys 24 is detected by, for example, matrix store 102, scanning circuit 104 and encoding circuit 106 (FIG. 5). Other suitable keyboard detecting and encoding apparatus can be used. Accordingly, keyboard representations of the selected class and zone are supplied to interface circuit 176 and through bus driver 174 to micro-processor unit 168 whereat such keyboard representations are used to form an address for PROM 172. This address selects particular locations in the PROM whereat weight rate data and package rate data corresponding to the selected class and zone are stored. Such data is read out from PROM 172 and supplied via bus driver 174 to micro-processor unit 168. The arithmetic unit included in the micro-processor unit then multiplies the weight rate data read out from PROM 172 by the weight data which had been determined in the manner described above. The product of this multiplying operation is added to the package weight data in the arithmetic unit to produce a representation of postage price. This postage price is stored in an addressed location in RAM 170 and also is supplied to interface circuit 176 by bus driver 174.

If a special service key is actuated, a representation thereof is supplied to interface circuit 176 and, through bus driver 174, to micro-processor 168 whereat the keyboard entered fee associated with this special service is added to the postage price previously determined. The sum of this special service fee and postage price represents the total postage price for shipping the weighed parcel to the selected destination zone via the class of service. This total price then may be stored in an addressed location in RAM 170 and, in addition, supplied to interface circuit 176 for activating appropriate display elements included in display 30.

In the event that a calibration operation is to be performed, the weight data derived from the load cell and supplied to interface circuit 176 is supplied by bus driver 174 to RAM 170 and to the arithmetic unit included in micro-processor unit 168. Suitable keyboard signals representing the selection of a calibration operation and representing the keyed-in weight also are supplied to interface circuit 176 and through bus driver 174 to RAM 170 and to the arithmetic unit included in the micro-processor unit. The arithmetic unit then performs a division operation whereby the quotient of the keyed-in weight divided by the measured weight is produced, this quotient corresponding to the aforedescribed calibration factor and being supplied from micro-processor unit 168 through bus driver 174 to an addressed location in RAM 170. Then, for all subsequent weighing operations, the calibration factor stored in the predetermined address in RAM 170 is read out therefrom and supplied to the arithmetic unit included in the micro-processor unit whereat the calibration factor is used to multiply the weight data derived from the load cell. It is this recalibrated weight data that is transmitted to interface circuit 176 from micro-processor unit 168 for display on display elements 30. Also, it is this recalibrated weight which is used to multiply the weight rate data read out from PROM 172 in accordance with the selected class and zone. Hence, the postage calculation performed by the micro-processor unit is dependent upon the recalibrated weight.

In order to perform a ZIP-to-zone conversion operation, keyboard entered ZIP code information is supplied to interface circuit 176. This keyboard information is stored in a particular address in RAM 170, and is used in the arithemtic unit of micro-processor unit 168 for comparison with ZIP code information which is read out of PROM 172. More particularly, PROM 172 is adapted to store the ZIP code and associated zone data, as aforesaid, and micro-processor instructions are effective to sequentially address appropriate locations in PROM 172 for reading out such ZIP code information in the manner described previously with respect to FIG. 7. When the read out ZIP code information is greater than or equal to the keyed in ZIP code data, micro-processor unit 168 ceases to sequentially address PROM 172 and now addresses the associated zone data location within the PROM such that the zone data is read out. This read out zone data is used by the micro-processor to establish the suitable address for selecting the proper weight and package rates stored in PROM 172, as discussed previously with respect to FIG. 5. Also, depending upon the particular instructions of micro-processor unit 168, the keyed in ZIP code data may be supplied to the micro-processor and then returned to interface circuit 176 for displaying the keyed in ZIP code on display 30. When the zone associated with the keyed in ZIP code is determined, this zone information may be read out from PROM 172 to micro-processor unit 168 and then transmitted to interface circuit 176 for display by display elements 30.

The determined weight, recalibrated weight, destination zone, destination ZIP code, postage price and total postage price may be stored in addressable locations in RAM 170. Micro-processor unit 168 controls the selected read out of such data to interface circuit 176 whereat the read out data is supplied to a segment driver for display by display elements 30. As each portion of the data stored in RAM 170 which is to be displayed is read out therefrom, a character selecting circuit is advanced so as to select a corresponding display element for energization. Thus, the advancing of the character selecting circuit and the successive reading out of addressable locations of RAM 170 for the purpose of displaying such read out data are controlled in synchronism by micro-processor unit 168 in accordance with suitable clock pulses supplied thereto by clock generator 178.

The foregoing description is a general discussion of the overall operation of the micro-processor implementation shown in the block diagram of FIG. 9. It is believed that one of ordinary skill in the art would be enabled to program micro-processor unit 168 in a manner so as to carry out the foregoing operations. Furthermore, and as is conventional, various other tasks, such as house keeping and the like, can be carried out in conjunction with the foregoing operation. A summary of general micro-processor instructions which can be used in conjunction with the apparatus shown in FIG. 9 for carrying out a postage calculation operation is set out in, for example, the 1975 data catalog from Intel Corp.

While the present invention has been particularly shown and described with reference to various preferred embodiments thereof, it should be readily apparent that various changes and modifications in form and details can be made by one of ordinary skill in the art without departing from the spirit and scope of the invention.

For example, although the BCD code has been suggested as an appropriate code for representing various data, other digital or binary codes known to those of ordinary skill in the art can be used. Also, other types of analog-to-digital converters, and circuits associated therewith, can be substituted for the particular converter discussed above. Furthermore, the determined parcel weight, calculated postage, etc. can be used to control other devices. For example, a postage printer or meter can be operated in response to the calculated postage. One such device that can be so operated is described in copending application Ser. No. 684,642 filed May 10, 1976 by Horbal et al. As other examples, accounting systems, computers and the like may be used to maintain various accounts which can be debited or credited or otherwise updated by the information derived from the described apparatus.

The various blocks shown in FIGS. 3-8 represent various logic circuits which are known to those of ordinary skill in the art. It is believed that detailed schematic diagrams of such known circuits merely would obfuscate the present invention and, for that reason, such schematic illustrations are not provided.

It is intended that the appended claims be interpreted as including the foregoing as well as all other changes, modifications and equivalents which fall within the scope of the present invention.

What is claimed is:

1. Apparatus for measuring a force, comprising means for receiving said force; means for generating a digital level representing said force and a digital reference level in the absence of said force and against which digital reference level said force representing digital level is compared; first storage means for storing the digital reference level; second storage means for storing said digital level representing said force; subtracting means for subtracting said stored digital reference level from said stored force representing digital level to provide a measurement of said force; means for repeatedly updating said force representing digital level; comparator means for comparing the latest updated digital level to the immediately preceding digital level; and means responsive to said comparator means for supplying said latest updated digital level to said first storage means if said latest updated digital level does not differ from said immediately preceding digital level by more than a predetermined amount, and for supplying said latest updated digital level to said second storage means if said latest updated digital level differs from said immediately preceding digital level by more than said predetermined amount.

2. An electronic postage scale for producing an indication of the postage required to send a parcel to a preselected destination via a preselected class of service in accordance with the weight of said parcel, comprising a weighing platform for receiving said parcel; a load cell for supporting said platform to produce an analog weight signal representing the sum of the weight of a parcel and said platform; converter means for converting said analog weight signal to a digital weight signal; means for supplying repeated samples of said digital weight signal; comparator means for comparing the latest sample of said digital weight signal to the immediately preceding sample of said digital weight signal; means for using said latest sample of said digital weight signal as a reference level if said latest sample of said digital weight signal does not differ from said immediately preceding sample of said digital weight signal by more than a predetermined amount in the absence of a parcel on said platform; subtracting means for subtracting said reference level from said latest sample of said digital weight signal to produce a weight data signal representing the difference between the load, which is formed of said parcel and said platform, and the reference level; keyboard means selectively operable to provide representations of a class of service and of a destination zone for said parcel; coding means for producing digital codes corresponding to the operated keyboard means; means for storing data representing the postage rate per unit of weight of a parcel for each selectable class of service and for each selectable destination zone within each said class; multiplying means for receiving said weight data signal and the postage rate data corresponding to the selected class and destination zone and for producing a digital postage signal proportional to the produce of said weight data signal and said postage rate data; and display means selectively responsive to said digital postage signal, the digital code corresponding to said selected destination zone and said weight data signal for selectively displaying the postage required to send said parcel to said preselected destination, the destination zone and the weight of said parcel.

3. The postage scale of claim 2 further comprising means for automatically calibrating said scale, and wherein said keyboard means is selectively operable to provide representations of a standard weight and said coding means produces a digital standard weight signal corresponding to said operated keyboard means; divider means for receiving a weight data signal produced when said standard weight is placed upon said platform and said digital standard weight signal for producing a calibration factor proportional to said digital standard weight signal divided by said last-mentioned weight data signal; and calibration multiplying means for multiplying subsequently produced weight data signals by said calibration factor before said weight data signals are supplied to the first-mentioned multiplying means.

4. The postage scale of claim 2 further comprising reference level storage means for storing the latest sample of said digital weight signal provided said latest sample of said digital weight signal does not differ from said immediately preceding sample of said digital weight signal by more than said predetermined amount; weight signal storage means for storing the latest sample of said digital weight signal in the event that said latest sample of said digital signal differs from the immediately preceding sample of said digital weight signal by more than said predetermined amount; and wherein said subtracting means subtracts the digital weight signal stored in said reference level storage means from said digital weight signal stored in said weight signal storage means to produce said weight data signal.

5. The postage scale of claim 2 wherein said coding means comprises storage means having a number of storage locations associated with respective keys of said keyboard means to store predetermined signals therein when said associated keys are operated; scanning means for scanning said storage locations; and means for producing a respective digital code when a storage location containing a predetermined signal therein is scanned.

6. The postage scale of claim 5 wherein said keyboard means includes keys representing special services, and wherein said means for producing a respective digital code produces codes representing additional postage when associated special service keys are operated; and further comprising adding means for adding said additional postage code to said digital postage signal to produce a total postage signal, the latter being supplied to said display means.

7. The postage scale of claim 2 wherein said display means comprises means for storing said digital postage signal in respective storage locations associated with each digit of said postage; means for storing said destination zone code in respective storage locations associated with each digit of said zone; means for storing said weight data signal in respective storage locations associated with each digit of said weight; visual display means for displaying each digit of said postage, said zone and said weight; and read-out means for reading out the data stored in each storage location to be correspondingly displayed by said visual display means.

8. The postage scale of claim 7 wherein said visual display means is comprised of a plurality of display elements; and said read-out means comprises an element driver supplied with said data read out from each storage location in sequence, and an element selector driven in synchronism with the reading out of said data from each storage location such that said display elements are selected sequentially for energization as said data is read out sequentially from said storage locations and the selected display element is energized by said element driver.

9. An electronic postage scale having a weighing platform for weighing a parcel to be sent, a keyboard comprised of selectable keys for selecting the class of service by which said parcel is to be sent and the destination zone for said parcel, and display means for displaying at least the postage required to send said parcel to said selected destination zone via said selected class of service, said electronic postage scale comprising means for producing digital signals representing the weight of said parcel; coding means for generating digital codes representing the particular keys which are selected; a data bus for receiving and transmitting said weight signal and said key codes; storage means coupled to said data bus for storing said weight signal and said key codes in addressable locations therein and for reading out said weight signal and said key codes from said addressable locations; read only memory means coupled to said data bus and containing tables therein representing the postage rate per unit weight for each destination zone in each class of service; and microprocessor means coupled to said data bus and having a set of instructions effective to access the locations in said storage means to read out the digital weight signals and the key codes therefrom and to access the read only memory means to read out the postage rate data corresponding to the class and zone as represented by said key codes, said micro-processor means including an arithmetic unit operative in response to instructions to multiply said read out postage rate data by said digital weight signals to produce postage data; output means to apply said postage data, zone code and digital weight signals to said data bus for display by said display means; a sampling unit to obtain successive samples of said digital signals representing weight at least when a parcel is absent from said platform; and a comparator unit to compare the latest of said samples to the next preceding sample and to store said latest sample in a first location in said storage means if said latest sample differs from said next preceding sample by less than a predetermined amount and to store said latest sample in a second location in said storage means if said latest sample differs from said next preceding sample by more than said predetermined amount; and wherein said arithmetic unit is operative in response to further instructions to subtract the contents of said first location from the contents of said second location to derive said digital weight signals.

10. The electronic postage scale of claim 9 wherein said arithmetic unit of said micro-processor means is operative in response to further instructions to perform a calibrating operation by reading out said key codes from said storage means when a calibration operation is initiated, said last-mentioned key codes representing standard weight data, dividing said standard weight data by said digital weight signals, the latter being produced when a standard weight is placed on said platform, so as to derive a calibration factor, and multiplying subsequently produced digital weight signals by said calibration factor to produce calibrated weight signals.

* * * * *